(12) United States Patent
Kumano et al.

(10) Patent No.: US 9,010,302 B2
(45) Date of Patent: Apr. 21, 2015

(54) CONTROL APPARATUS OF A DIRECT INJECTION GASOLINE ENGINE

(75) Inventors: Kengo Kumano, Hitachinaka (JP);
Yoshihiro Sukegawa, Hitachi (JP);
Yusuke Kihara, Hitachinaka (JP);
Takashi Okamoto, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 671 days.

(21) Appl. No.: 13/233,226

(22) Filed: Sep. 15, 2011

(65) Prior Publication Data

US 2012/0097126 A1 Apr. 26, 2012

(30) Foreign Application Priority Data

Oct. 21, 2010 (JP) .................. 2010-236062

(51) Int. Cl.
| | | |
|---|---|---|
| F02D 13/00 | (2006.01) | |
| F02D 41/00 | (2006.01) | |
| F02D 13/02 | (2006.01) | |
| F02D 41/10 | (2006.01) | |
| F02M 25/07 | (2006.01) | |
| F02B 75/12 | (2006.01) | |
| F02D 41/38 | (2006.01) | |

(52) U.S. Cl.
CPC ......... *F02D 41/006* (2013.01); *F02B 2075/125* (2013.01); *F02D 13/0219* (2013.01); *F02D 13/0265* (2013.01); *F02D 41/10* (2013.01); *F02D 41/3818* (2013.01); *F02D 41/3836* (2013.01); *F02D 2250/31* (2013.01); *F02M 25/0752* (2013.01); *Y02T 10/123* (2013.01); *Y02T 10/47* (2013.01); *Y02T 10/18* (2013.01)

(58) Field of Classification Search
CPC .......... F02D 2041/001; F02D 13/0257; F02D 13/0284
USPC .............. 123/90.15, 294, 299, 300, 456, 321, 123/319, 347, 348
See application file for complete search history.

(56) References Cited

U.S. PATENT DOCUMENTS

| | | | | |
|---|---|---|---|---|
| 4,009,695 | A * | 3/1977 | Ule ............................. | 123/90.13 |
| 2001/0050067 | A1* | 12/2001 | Sato ............................ | 123/90.17 |
| 2007/0074702 | A1* | 4/2007 | Nakamura et al. ............ | 123/299 |
| 2007/0209618 | A1* | 9/2007 | Leone ......................... | 123/90.12 |
| 2009/0159027 | A1* | 6/2009 | Nakamura ................. | 123/90.17 |
| 2009/0164105 | A1 | 6/2009 | Ma et al. | |
| 2009/0205889 | A1* | 8/2009 | Leone ..................... | 180/65.265 |

(Continued)

FOREIGN PATENT DOCUMENTS

| | | |
|---|---|---|
| EP | 0 828 071 A2 | 3/1998 |
| JP | 11-62645 A | 3/1999 |

(Continued)

OTHER PUBLICATIONS

Japanese Office Action dated Sep. 19, 2013 (Three (3) pages).

(Continued)

*Primary Examiner* — John Kwon
(74) *Attorney, Agent, or Firm* — Crowell & Moring LLP

(57) ABSTRACT

In a direct injection gasoline engine, at acceleration operation, an amount of internal EGR is increased by advancing exhaust valve closing timing, and also fuel injection pressure is increased. In this case, range of increase in fuel injection pressure is determined on the basis of the exhaust valve closing timing at present.

7 Claims, 23 Drawing Sheets

(56) References Cited

U.S. PATENT DOCUMENTS

2010/0161203 A1*  6/2010  Shigenaga et al. ............ 701/110
2010/0204903 A1*  8/2010  Nakatani et al. .............. 701/103

FOREIGN PATENT DOCUMENTS

| JP | 2000-205014 A | 7/2000 |
| JP | 2002-89341 A | 3/2002 |
| JP | 2002-327651 A | 11/2002 |
| JP | 2004-32904 A | 1/2004 |
| JP | 2004-293392 A | 10/2004 |
| JP | 2009-46996 A | 3/2009 |
| JP | 2009-138589 A | 6/2009 |
| JP | 2010-223096 A | 10/2010 |

OTHER PUBLICATIONS

English-language translation of a Chinese Office Action dated Feb. 7, 2014 (three (3) pages).
Japanese Office Action dated May 27, 2014 (two (2) pages).
European Search Report dated Sep. 26, 2014 (eight (8) pages).

\* cited by examiner

CONTROL APPARATUS OF A DIRECT INJECTION GASOLINE ENGINE

BACKGROUND OF THE INVENTION

The present invention relates to a control apparatus of a gasoline engine, and more particularly to a control apparatus suitable for reducing an amount of emission of so-called particulate matters (PM) in a direct injection gasoline engine.

The direct injection gasoline engine has a problem that it has a larger amount of PM emission than an intake port injection type gasoline engine. The causes of this problem are fuel adhesion to a cylinder and a piston due to direct injection of fuel into the cylinder, and existence of local fuel rich regions caused by insufficient mixing of fuel and air. Therefore, as measure for reducing the amount of PM emission in the direct injection gasoline engine, it is effective to reduce an amount of fuel adhesion and to promote mixing of fuel and air.

As technique to suppress the amount of PM emission in the direct injection gasoline engine, technique is known in which hot exhaust gas is made to exist in the combustion chamber during engine cold start upon which the amount of PM emission is large, that is, technique in which the vaporization of the fuel is promoted by introducing internal EGR (Exhaust Gas Recirculation) and thereby emission of black smoke is reduced (JP-A-2002-327651).

However, not only the amount of PM emission during engine cold start but also the amount of PM emission after the engine is fully warmed up cannot be neglected. In particular, the amount of PM emission is increased during acceleration operation in which air-fuel mixture in the cylinder is likely to be in a fuel rich state due to the difference in control responsiveness between air and fuel. Further, there is a problem that the amount of PM emission is increased during acceleration operation because, even when parameters of respective engine devices (for valve operation, for fuel injection, for ignition, and the like) are set to reduce the amount of PM emission, combustion chamber transiently passes through a state different from desired state due to a parameter providing a slow response. Therefore, in order to reduce the amount of PM emission at the time of acceleration operation, it is necessary to sufficiently take into consideration the transient responsiveness of each of the devices.

In view of the above described problems, an object of the present invention is to provide a control apparatus of a direct injection gasoline engine, the control apparatus being capable of reducing the amount of PM emission even during acceleration operation in which the air-fuel ratio in the cylinder is likely to be in a fuel rich state.

SUMMARY OF THE INVENTION

In order to achieve the above described object, a control apparatus of a direct injection gasoline engine according to the present invention, wherein the engine includes a variable valve mechanism at an exhaust valve, the control apparatus is characterized in that it includes operation state determining means for determining operation state of a vehicle, and in that, when it is determined by the operation state determining means that the operation state of the vehicle is changed from constant speed operation or deceleration operation to acceleration operation, valve closing timing of the exhaust valve is advanced.

With this structure, at the time of acceleration operation in which the air-fuel mixture in the cylinder is likely to be in a fuel rich state, internal EGR is introduced by advancing valve closing timing of the exhaust valve, so as to promote vaporization of the fuel, and thereby generation of PM and the amount of PM emission can be reduced.

Further, as another aspect of the control apparatus of the direct injection gasoline engine according to the present invention, wherein the engine includes a variable valve mechanism at an exhaust valve, the control apparatus is characterized in that it includes operation state determining means for determining operation state of a vehicle, and in that, when it is determined by the operation state determining means that the operation state of the vehicle is changed from constant speed operation or deceleration operation to acceleration operation, valve closing timing of the exhaust valve is advanced and fuel injection pressure is increased.

With this structure, even in the case where response speed of the exhaust valve control is slow and it takes several cycles for an amount of internal EGR to reach a desired value (target value), the fuel pressure having high response speed is increased to atomize the fuel during the period until the amount of internal EGR reaches the desired value. Thereby, vaporization of the fuel is promoted, so that generation of PM and an amount of emission of PM can be suppressed.

Further, as another aspect of the control apparatus of the direct injection gasoline engine according to the present invention, wherein the engine includes a variable valve mechanism at an exhaust valve, the control apparatus is characterized in that it includes operation state determining means for determining operation state of a vehicle, and in that, when it is determined by the operation state determining means that the operation state of the vehicle is changed from constant speed operation or deceleration operation to acceleration operation, valve closing timing of the exhaust valve is advanced and fuel injection pressure is increased, and further range of increase in the fuel injection pressure is reduced in accompanying with the valve closing timing of the exhaust valve being advanced.

With this structure, by reducing range of increase in the fuel injection pressure in accompanying with the internal EGR approaching a desired value (target value), increase in drive force of a fuel pump due to increase in the fuel injection pressure is suppressed to a minimum while the amount of PM emission is suppressed. Thereby, fuel consumption of the vehicle can be improved.

Further, as another aspect of the control apparatus of the direct injection gasoline engine according to the present invention, wherein the engine includes a motor connected to an output shaft of the engine directly or via a gear, the control apparatus is characterized in that, when it is determined by operation state determining means that operation state of a vehicle is changed from constant speed operation or deceleration operation to acceleration operation, drive force of the gasoline engine or drive force of the motor is controlled so that a ratio of the drive force of the motor to a total drive force of the vehicle is increased.

With this structure, even in the case where, due to increase in an amount of internal EGR at the time of acceleration operation, a response delay is caused in an intake air amount and thereby engine torque response is deteriorated, the vehicle drive force (torque) is assisted by the motor, so that an amount of PM emission can be reduced without deteriorating acceleration performance of the vehicle.

According to the present invention, even at the time of acceleration operation in which air-fuel mixture is likely to be in a fuel rich state, an amount of PM emission can be suppressed by increasing an amount of internal EGR, while deterioration of fuel consumption is suppressed to a minimum.

Other objects, features and advantages of the invention will become apparent from the following description of the embodiments of the invention taken in conjunction with the accompanying drawings.

DESCRIPTION OF THE EMBODIMENTS

Hereinafter, configuration and operation of a control apparatus of a direct injection gasoline engine according to a first embodiment of the present invention will be described with reference to FIG. 1 to FIG. 8.

First, configuration of a system, in which the control apparatus of the direct injection gasoline engine according to the present embodiment is applied to a gasoline engine for an automobile, will be described with reference to FIG. 1.

Figure 1:
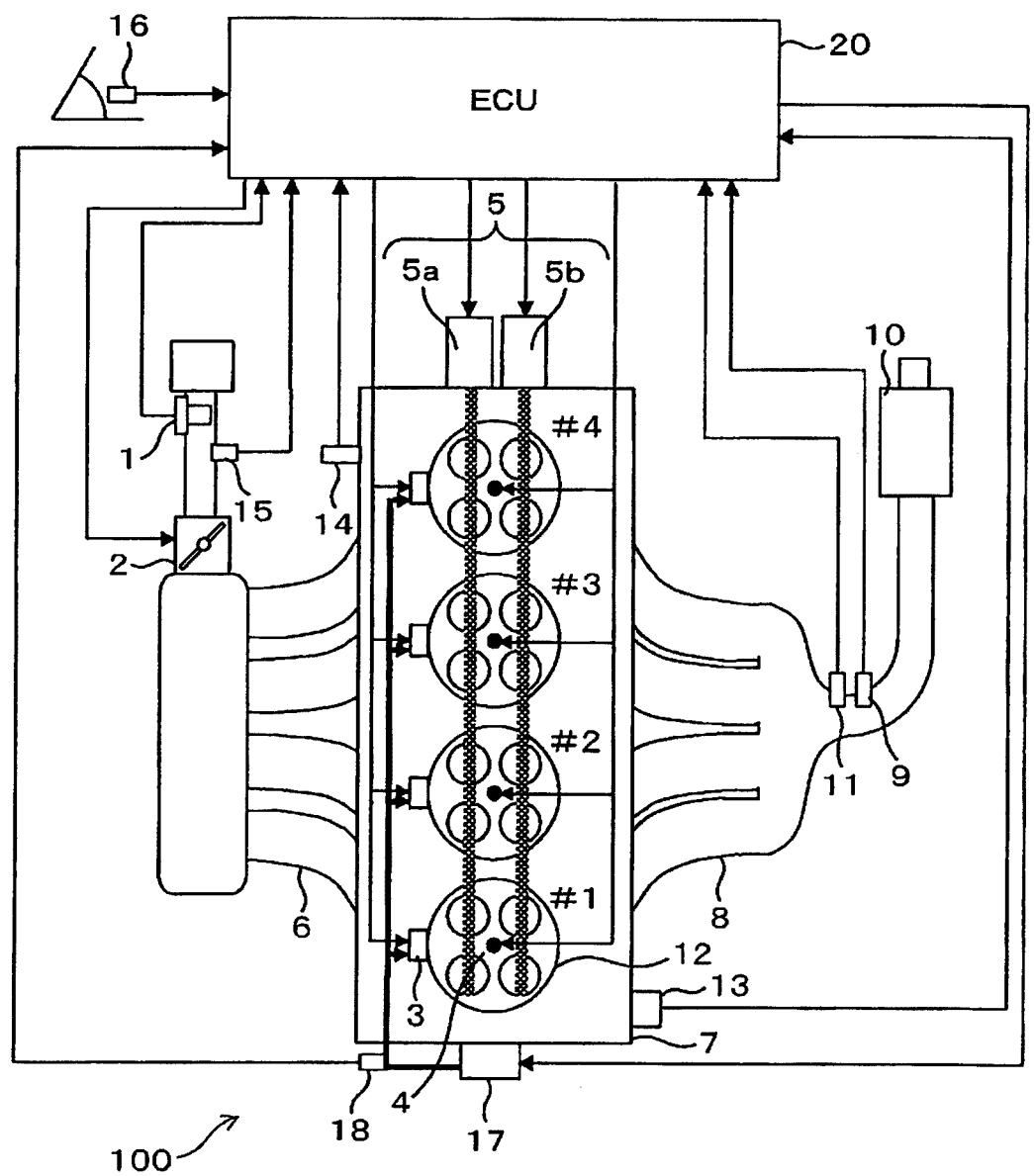
FIG. 1 is a view showing a configuration of a system in which a control apparatus of a direct injection gasoline engine according to a first embodiment of the present invention is applied to a gasoline engine for an automobile.

FIG. 1 is a view showing the configuration of the system in which the control apparatus of the direct injection gasoline engine according to a first embodiment of the present invention is applied to the gasoline engine for an automobile.

An engine 100 is a four-cylinder gasoline engine for an automobile, in which spark ignition combustion is carried out. An air flow sensor 1 which measures an intake air amount, an electronically-controlled throttle 2 which adjusts intake pipe pressure, and an intake air temperature sensor 15 which is a form of the intake air temperature detectors and measures temperature of intake air are provided at suitable positions of an intake pipe 6, respectively. Further, in the engine 100, a fuel injector (hereinafter referred to as an injector) 3 which injects fuel into a combustion chamber 12 of a cylinder, and an ignition plug 4 which supplies ignition energy are provided at each cylinder, and a cooling water temperature sensor 14 which measures temperature of engine cooling water is provided at a suitable position of a cylinder head 7. Further, a variable valve 5 comprising a variable intake valve device 5a which adjusts intake gas flowing into the cylinder and a variable exhaust valve device 5b which adjusts exhaust gas discharged from the cylinder is provided at a suitable position of the cylinder head 7. An intake air amount and an EGR amount of all No. 1 to No. 4 cylinders are adjusted by adjusting the variable valve 5. Further, a high pressure fuel pump 17 for supplying high pressure fuel to the fuel injectors 3 is connected to the fuel injectors 3 by a fuel pipe. A fuel pressure sensor 18 for measuring fuel injection pressure is provided in the fuel pipe.

Further, a three-way catalyst 10 which purifies exhaust gas, an air-fuel ratio sensor 9 which is one form of air-fuel ratio detectors and which detects air-fuel ratio of the exhaust gas on an upstream side of the three-way catalyst 10, and an exhaust gas temperature sensor 11 which is one form of exhaust gas temperature detectors and which measures temperature of the exhaust gas on an upstream side of the three-way catalyst 10 are provided at suitable positions of an exhaust pipe 8, respectively. Further, a crank angle sensor 13 for calculating rotational angle of a crankshaft is provided at a crankshaft.

Signals obtained from the air flow sensor 1, the air-fuel ratio sensor 9, the cooling water temperature sensor 14, the intake air temperature sensor 15, the exhaust gas temperature sensor 11, the crank angle sensor 13 and the fuel pressure sensor 18 are sent to an engine control unit (ECU) 20. Also, a signal obtained from an accelerator opening degree sensor 16 is sent to the ECU 20. The accelerator opening degree sensor 16 detects a depression amount of an accelerator, that is, an accelerator opening degree. The ECU 20 calculates request torque on the basis of an output of the accelerator opening degree sensor 16. That is, the accelerator opening degree sensor 16 is used as a request torque detection sensor which detects the request torque to the engine. Further, the ECU 20 calculates rotation speed of the engine on the basis of an output signal of the crank angle sensor 13. The ECU 20 optimally calculates principal operation amounts of the engine, which are an air flow rate, a fuel injection amount, ignition timing, fuel pressure and the like on the basis of operating state of the engine, which state is obtained from the outputs of the above-described various sensors.

The fuel injection amount calculated by the ECU 20 is converted into a valve-opening pulse signal and sent to the injector 3. Ignition plug drive signal is sent to the ignition plug 4 so that ignition is performed at the ignition timing calculated by the ECU 20. A throttle opening degree calculated by the ECU 20 is sent as a throttle drive signal to the electronically-controlled throttle 2. An operation amount of the variable valve calculated by the ECU 20 is sent as a variable valve drive signal to the variable valve 5. Further, fuel pressure calculated by ECU 20 is sent as high pressure fuel pump drive signal to the high pressure fuel pump 17.

Fuel is injected into air flowing from the intake pipe 6 into the combustion chamber 12 via the intake valve, so that an air-fuel mixture is formed. The mixture is exploded by a spark generated by the ignition plug 4 at a predetermined ignition timing, and combustion pressure thereof pushes down the piston, thereby providing drive force of the engine. Further, the exhaust gas after the explosion is fed into the three-way catalyst 10 via the exhaust pipe 8, and the exhaust gas whose components are purified in the three-way catalyst 10 is discharged to the outside.

Next, structure of the control apparatus of the direct injection gasoline engine according to the present embodiment will be described with reference to FIG. 2.

Figure 2:
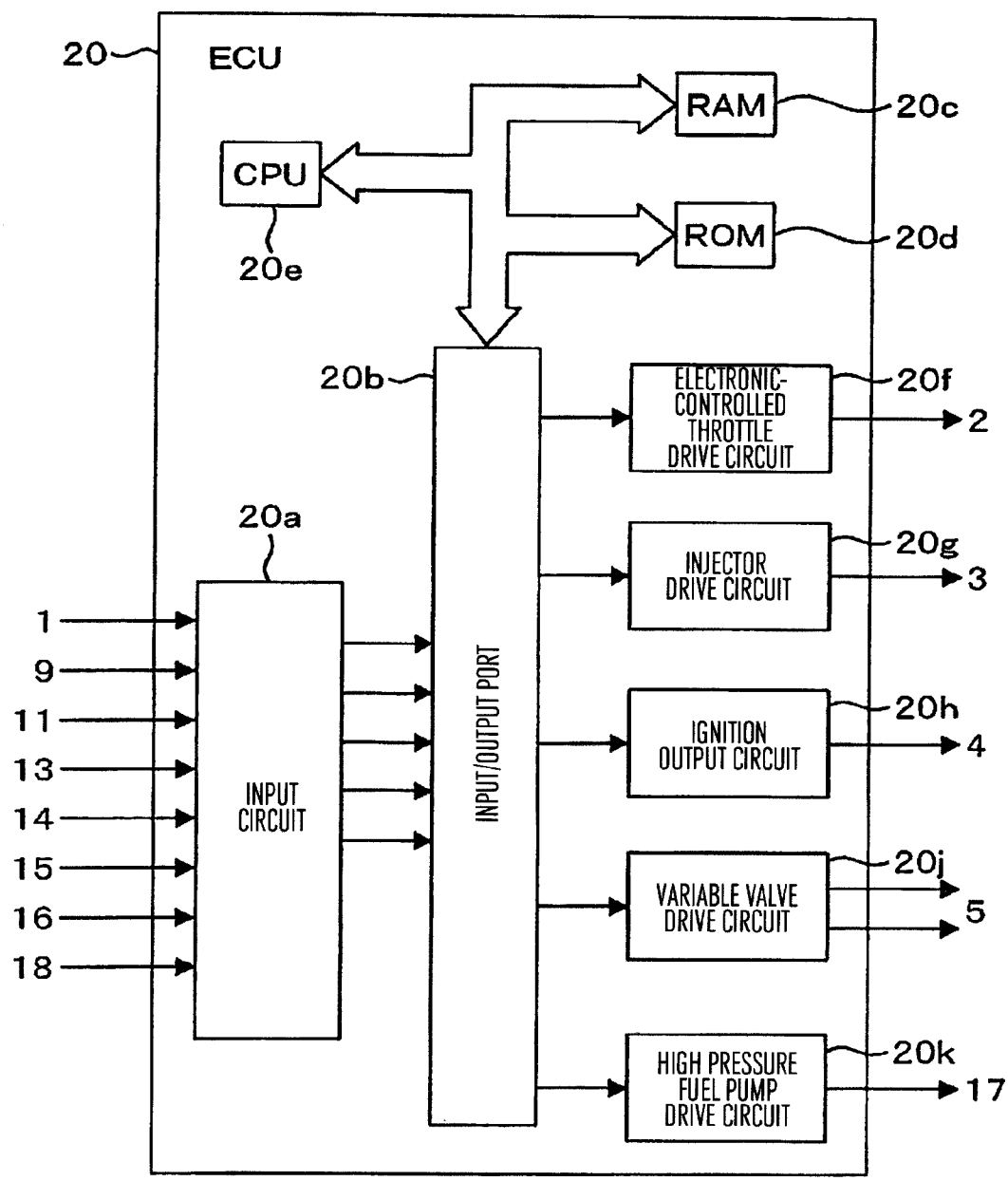
FIG. 2 is a system block diagram showing a configuration of the control apparatus of the direct injection gasoline engine according to the first embodiment of the present invention.

FIG. 2 is a system block diagram showing the structure of the control apparatus of the direct injection gasoline engine according to the first embodiment of the present invention.

Output signals of the air flow sensor 1, the air-fuel ratio sensor 9, the exhaust gas temperature sensor 11, the crank angle sensor 13, the cooling water temperature sensor 14, the intake air temperature sensor 15, the accelerator opening degree sensor 16 and the fuel pressure sensor 18 are inputted to an input circuit 20a of the ECU 20. However, input signals are not limited to these signals. The input signal of each sensor that has been inputted is sent to an input port within an input/output port 20b. Values sent to the input/output port 20b are saved in a RAM 20c and are subjected to calculation processing in a CPU 20e. A control program in which details of the calculation processing are described is written beforehand in a ROM 20d.

Each value which indicates an operation amount of each actuator and which is calculated according to the control program is saved in a RAM 20c, and is then sent to output ports in the input/output port 20b, so as to be sent to each actuator via each drive circuit. In the case of the present embodiment, there are provided, as drive circuits, an electronically-controlled throttle drive circuit 20f, an injector drive circuit 20g, an ignition output circuit 20h, a variable valve drive circuit 20j and a high pressure fuel pump drive circuit 20k. The respective circuits control the electronically-controlled throttle 2, the injector 3, the ignition plug 4, the variable valve 5 and the high pressure fuel pump 17, respectively. In the present embodiment, the ECU 20 includes the above-described drive circuits. However, this arrangement is not restrictive, and the ECU 20 may include any of the above-described drive circuits.

The ECU 20 controls, by using the variable valve 5, an amount of the exhaust gas (an amount of internal EGR) left in the combustion chamber. In particular, at the time of acceleration operation, the ECU 20 advances the valve closing timing of the exhaust valve, so that the amount of internal EGR is increased and thereby the amount of PM emission is suppressed. Further, at the time of acceleration operation, the ECU 20 increases the fuel injection pressure. Also, the ECU 20 reduces range of increase in the fuel injection pressure as the valve closing timing of the exhaust valve is advanced. As a result, the amount of PM emission can be suppressed at the acceleration operation.

Next, characteristics of the variable valve in the control apparatus of the direct injection gasoline engine according to the present embodiment will be described with reference to FIG. 3.

Figure 3:
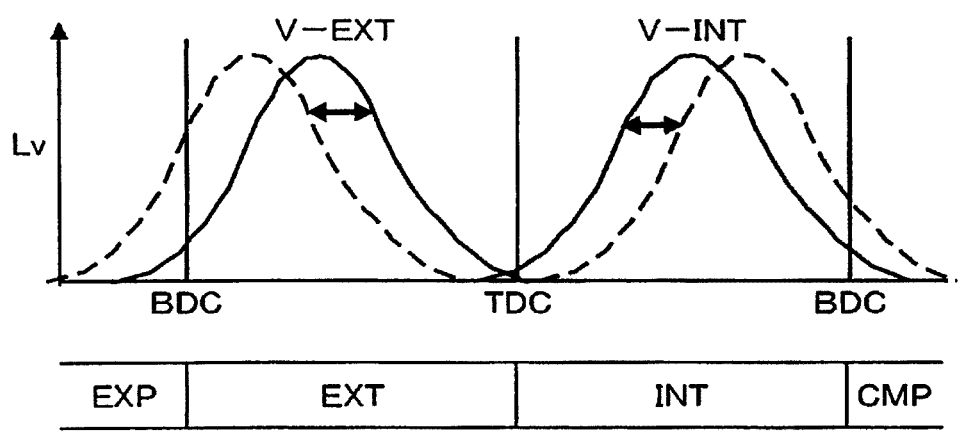
FIG. 3 is an illustration for explaining characteristics of a variable valve mechanism in the control apparatus of the direct injection gasoline engine according to the first embodiment of the present invention.

FIG. 3 is an illustration for explaining characteristics of a variable valve mechanism in the control apparatus of the direct injection gasoline engine according to the first embodiment of the present invention. In the present embodiment, each of the intake valve and the exhaust valve is provided with a continuous phase variable mechanism, and hence opening timing and closing timing of each of the valves can be controlled.

Next, behavior of the air amount and the fuel amount at acceleration operation in the control apparatus of the direct injection gasoline engine according to the present embodiment will be described with reference to FIG. 4.

Figure 4:
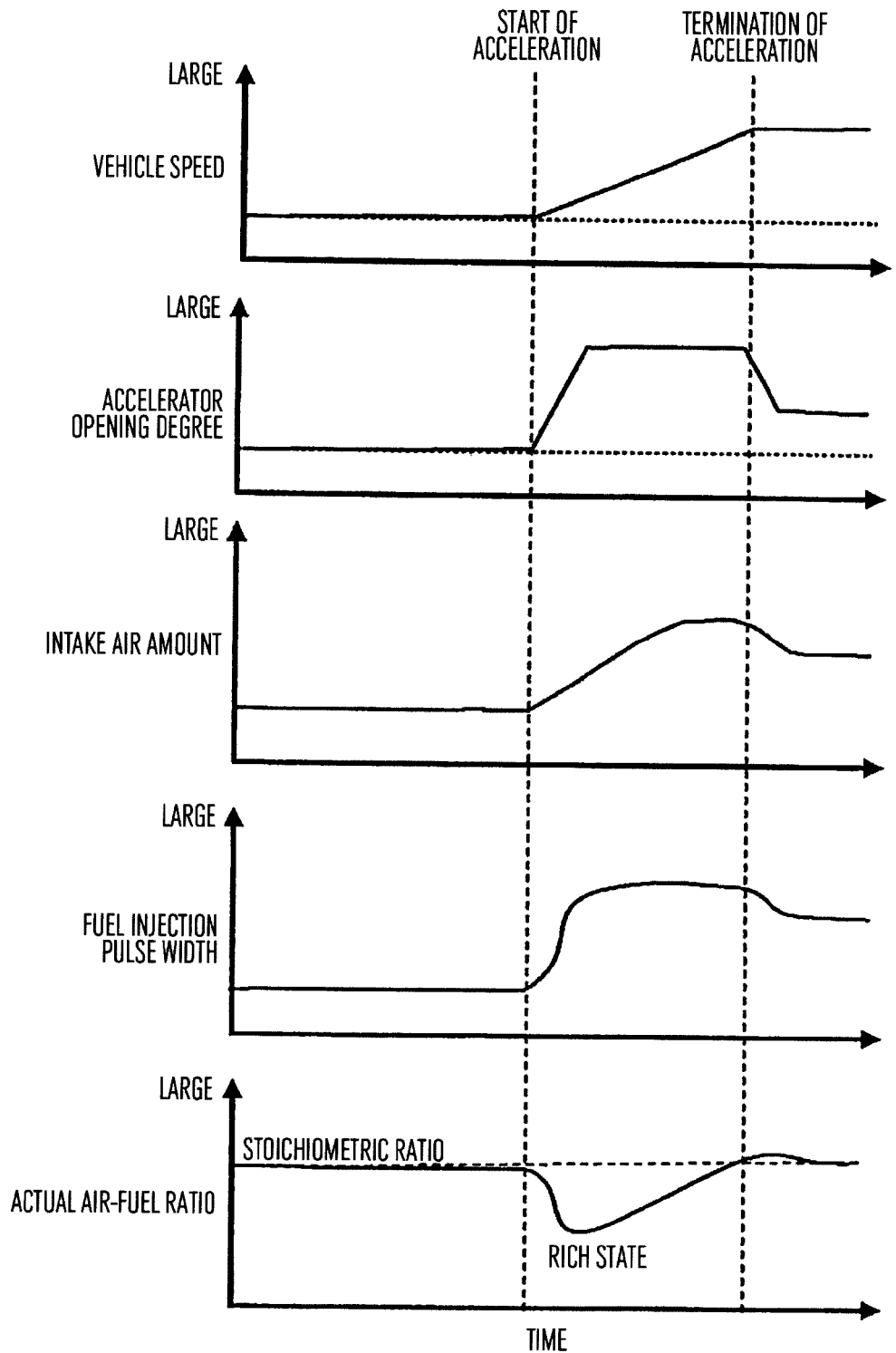
FIG. 4 is a time chart of the fuel amount and the air amount at the time of acceleration operation in the control apparatus of the direct injection gasoline engine according to the first embodiment of the present invention.

FIG. 4 is a time chart of the fuel amount and the air amount at acceleration operation in the control apparatus of the direct injection gasoline engine according to the first embodiment of the present invention. In FIG. 4, the time-dependent changes of the vehicle speed, the accelerator opening degree, the intake air amount, the fuel injection pulse width and the actual air-fuel ratio are shown in order from the top.

First, acceleration operation of the vehicle is started when a driver depresses the accelerator pedal (the accelerator opening degree is increased). Accompanying this, the intake-air throttle is opened and the intake air amount is increased. Further, by enlarging the fuel injection pulse width, the fuel injection amount is increased.

Here, the intake pipe having a fixed volume exists between the throttle valve and the combustion chamber, and the intake air is supplied to the combustion chamber via the intake pipe. Therefore, the amount of intake air supplied to the combustion chamber has a large response delay with respect to the accelerator opening degree (throttle opening degree).

On the other hand, since fuel is directly injected into the cylinder via the injector, the fuel injection amount can be precisely controlled for each cycle, and hence no response delay of the fuel injection amount is caused with respect to the accelerator opening degree. Therefore, a difference in the transient responsibility is caused between the intake air amount and the fuel injection amount. Thus, at acceleration operation, the fuel injection amount increases prior to the increase in the intake air amount, so that fuel is made temporarily in rich state. Usually, the fuel injection amount is subjected to transient correction control so that the air-fuel ratio in the cylinder becomes a desired value even in a transient state. However, since it is difficult to accurately measure the intake air amount in the transient state, the intake air amount cannot be controlled to provide the desired air-fuel ratio (≈the stoichiometric ratio), so that the air-fuel mixture in the cylinder necessarily passes through a fuel-rich state. As described above, when the air-fuel mixture is in the fuel-rich state, an amount of fuel adhesion and local fuel rich regions, which cause PM emission, are increased. Therefore, as will be described hereinafter, it is necessary to perform control for reducing the PM emission at the time of acceleration operation.

Next, a control method of the variable valve and the fuel injection pressure in the control apparatus of the direct injection gasoline engine according to the present embodiment will be described with reference to FIG. 5 to FIG. 8.

First, basic principle of method for reducing an amount of PM emission in the control apparatus of the direct injection gasoline engine according to present embodiment will be described with reference to FIG. 5.

Figure 5:
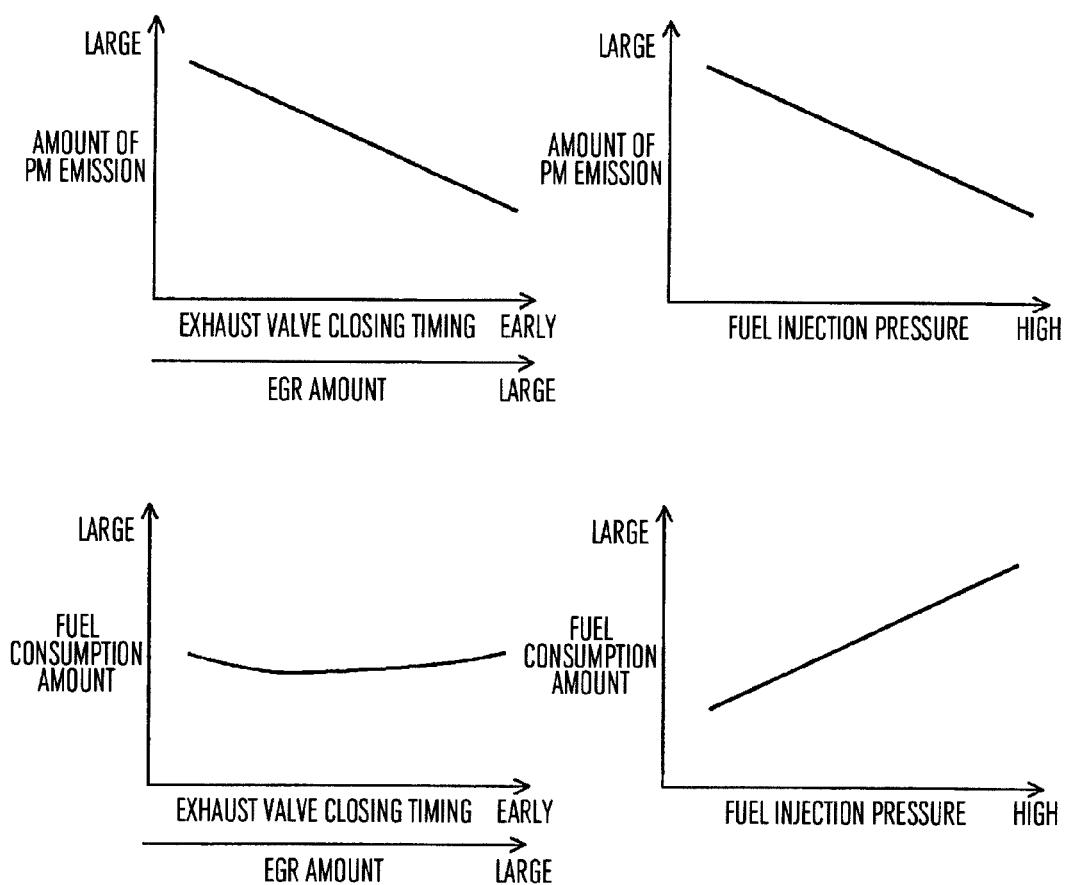
FIG. 5 is a view showing basic principle of PM reduction method in the control apparatus of the direct injection gasoline engine according to the first embodiment of the present invention.

FIG. 5 is a view showing relationship between exhaust valve closing timing and an amount of PM emission, relationship between fuel injection pressure and an amount of PM emission, relationship between exhaust valve closing timing and fuel consumption amount and relationship between fuel injection pressure and fuel consumption amount. First, the relationship between an amount of PM emission and exhaust valve closing timing and the relationship between an amount of PM emission and fuel injection pressure are described. An amount of internal EGR is increased by advancing the exhaust valve closing timing, so that temperature of the gas in the cylinder is increased. Vaporization of the fuel injected into the cylinder is promoted by the increase in the temperature of the gas in the cylinder, so that an amount of fuel adhesion and local fuel rich regions are reduced. Therefore, as shown in FIG. 5 (upper left), an amount of PM emission can be reduced by advancing the valve closing timing of the exhaust valve.

Further, when the fuel injection pressure is increased, the fuel injected into the cylinder is atomized, so that vaporization of the fuel is promoted. Thereby, an amount of fuel adhesion and local fuel rich regions are reduced. Therefore, as shown in FIG. 5 (upper right), an amount of PM emission can be reduced by increasing the fuel injection pressure.

Next, the relationship between the fuel consumption amount and each of the exhaust valve closing timing and the fuel injection pressure is described. An amount of internal EGR is increased by advancing the exhaust valve closing timing. When an amount of internal EGR is increased, "reduction of pumping loss" which leads to the improvement in fuel consumption, and "reduction of combustion speed due to increase in an amount of inert gas" which leads to deterioration of fuel consumption are simultaneously caused. When the two effects are combined with each other, the relationship between the valve closing timing of the exhaust valve and the fuel consumption amount becomes as shown in FIG. 5 (lower left).

On the other hand, there is a disadvantage that, in order to increase the fuel injection pressure, it is necessary to increase the drive force of the high pressure fuel pump 17, and hence the fuel consumption amount is increased by an amount corresponding to the increase in the drive force of the high pressure fuel pump 17. Therefore, the relationship between the fuel injection pressure and the fuel consumption amount becomes as shown in FIG. 5 (lower right).

As described above, advancing the valve closing timing of the exhaust valve and increasing the fuel injection pressure are both effective as measures to reduce an amount of PM emission, but advancing the exhaust valve closing timing is more advantageous in view of the fuel consumption amount (fuel cost).

Next, the contents of control of the variable valve (exhaust valve) and the fuel injection pressure in the control apparatus of the direct injection gasoline engine according to the present embodiment will be described with reference to FIG. 6.

Figure 6:
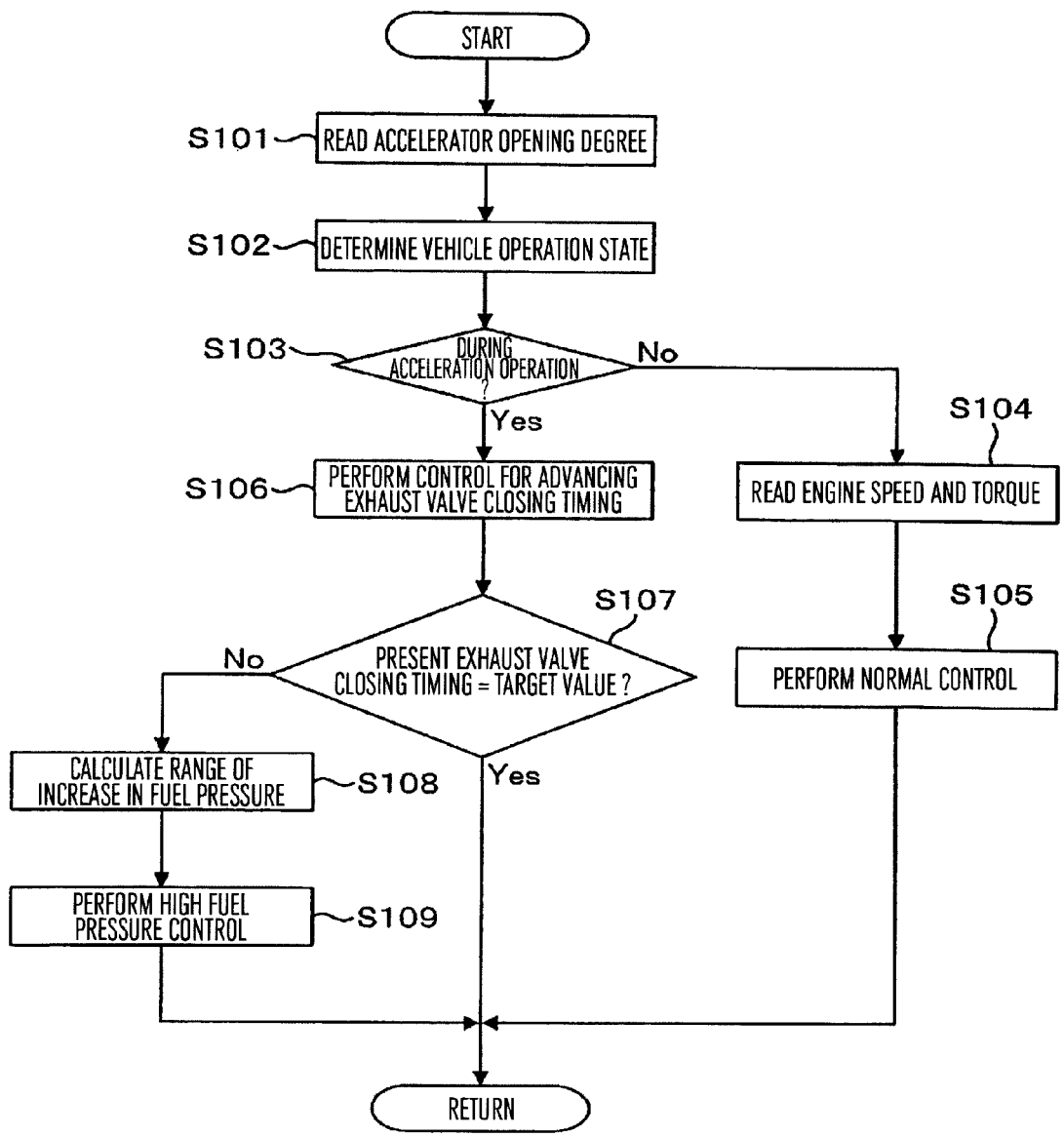
FIG. 6 is a flow chart showing contents of control of a variable valve and fuel pressure at the time of acceleration operation in the control apparatus of the direct injection gasoline engine according to the first embodiment of the present invention.

FIG. 6 is a flow chart showing the contents of control of the variable valve and the fuel injection pressure in the control apparatus of the direct injection gasoline engine according to the first embodiment of the present invention. The contents of control shown in FIG. 6 are executed by the ECU 20 repeatedly at predetermined intervals.

In step S101, the ECU 20 reads the present value of the accelerator opening degree sensor 16. Next, in step S102, on the basis of the present value of the accelerator opening degree sensor 16, the present operation state of the vehicle is determined. For example, when the present accelerator opening degree is a predetermined accelerator opening degree or larger, the present operation state is determined as acceleration operation state, while when the present accelerator opening degree is a predetermined accelerator opening degree or less, the present operation state is determined as constant speed operation or deceleration operation state. In the above, an example is described, in which the vehicle operation state is determined on the basis of the accelerator opening degree. Alternatively, the vehicle operation state may also be determined on the basis of the vehicle speed and the intake pipe pressure.

Next, in step S103, it is determined whether or not the present operation state of the vehicle is in acceleration operation state. When the present operation state of the vehicle is not in acceleration operation state (that is, in constant speed operation state or deceleration operation state), the operation is proceeded to step S104, and information about the present engine operating conditions (engine speed, required engine torque, and the like) are read. Then, the operation is proceeded to step S105 and the ECU 20 performs normal control. The normal control is control in which the control value of each of the devices (the variable valve and the high pressure fuel pump) is read from a predetermined map, and the like, by using the engine speed, the engine torque, and the like, and the devices are controlled on the basis of the control values.

When it is determined in step S103 that the present operation state of the vehicle is in acceleration operation state, the operation is proceeded to step S106 and control to advance the valve closing timing of the exhaust valve is performed in order to increase an amount of the internal EGR. At this time, in order to increase an amount of the internal EGR, it is necessary to further advance the valve closing timing of the exhaust valve with respect to the top dead center. A target valve closing timing of the exhaust valve is determined on the basis of the accelerator opening degree, the engine speed, and the like.

Next, in step S107, it is determined whether or not the present valve closing timing of the exhaust valve has reached the target valve closing timing of the exhaust valve. When it is determined in step S107 that the valve closing timing of the exhaust valve has not reached the target value yet, in other words, the control state is in response delay period of the exhaust valve control, the operation is proceeded to step S108, and a range of increase in the fuel pressure necessary for compensating the response delay of the internal EGR is calculated. The range of increase in the fuel pressure can be calculated from the present valve closing timing of the exhaust valve (that is, the present amount of the internal EGR). Then, the operation is proceeded to step S109 and the high fuel pressure control is performed on the basis of the range of increase in the fuel pressure. When it is determined in step S107 that the valve closing timing of the exhaust valve has already reached the target value, the control is terminated without performing a series of fuel pressure increase control operations.

Next, the contents of control of the variable valve and the fuel injection pressure at acceleration operation in the control apparatus of the direct injection gasoline engine according to the present embodiment will be described in detail with reference to FIG. 7 and FIG. 8.

Figure 7:
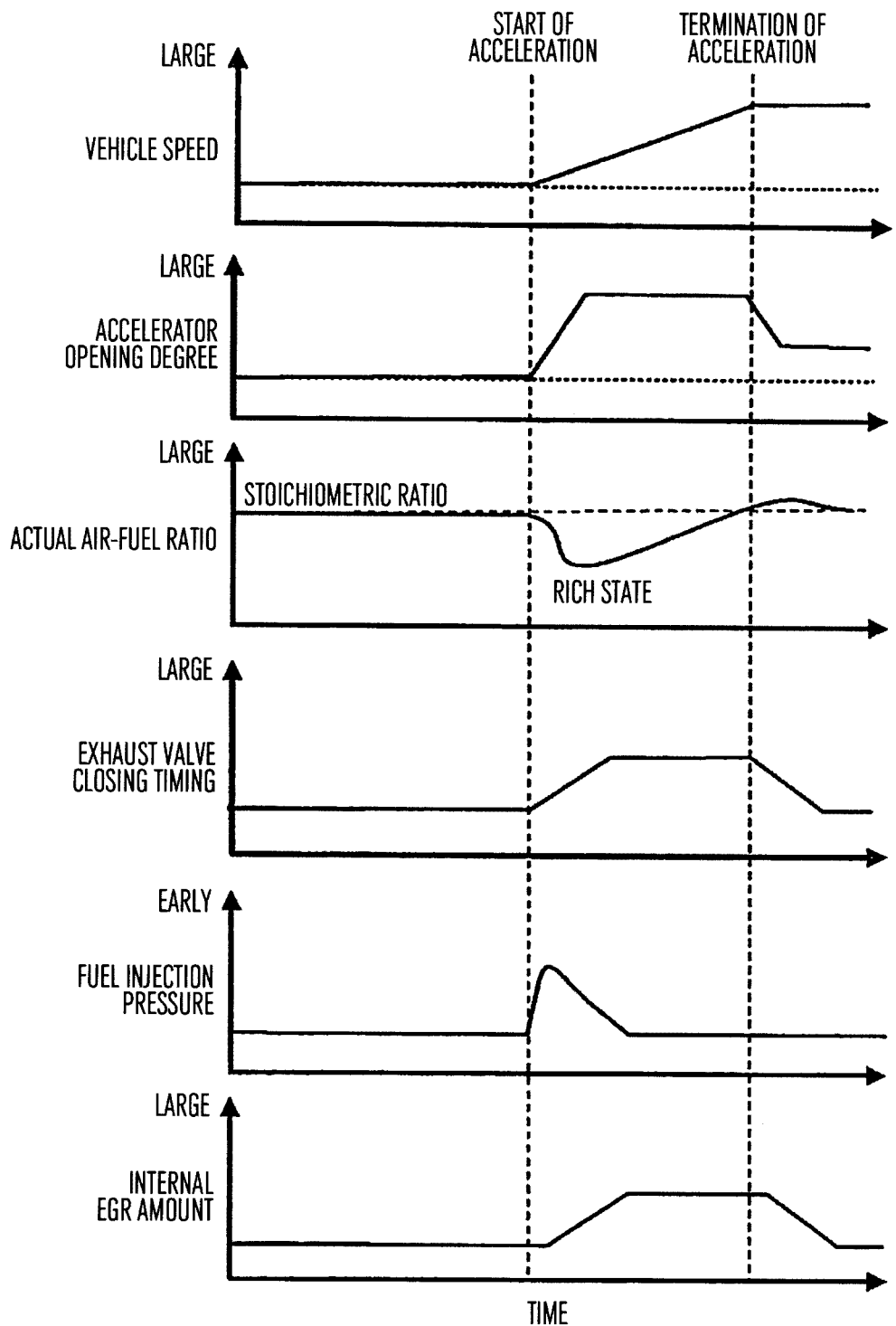
FIG. 7 is a time chart of the control of a variable valve and fuel pressure at the time of acceleration operation in the control apparatus of the direct injection gasoline engine according to the first embodiment of the present invention.

FIG. 7 is a time chart of the control of the variable valve (the valve closing timing of the exhaust valve) and the fuel injection pressure at acceleration operation in the control apparatus of the direct injection gasoline engine according to the first embodiment of the present invention. In FIG. 7, time-based changes of the vehicle speed, the accelerator opening degree, the actual air-fuel ratio, the exhaust valve closing timing, the fuel injection pressure, and an amount of the internal EGR are shown in order from the top. At constant speed operation, the normal exhaust valve control and the normal fuel injection pressure control are performed in accordance with the engine speed and the engine torque. Thereafter, when the driver depresses the accelerator pedal, the accelerator opening degree is increased, so that the vehicle is accelerated. At the time of acceleration operation, it is difficult to maintain the air-fuel ratio in the cylinder at a constant level as described above, and hence the actual air-fuel ratio in the cylinder is shifted to the rich side as shown in FIG. 7. When it is determined that the accelerator opening degree is increased and acceleration operation is initiated, the ECU 20 starts the variable valve control and the fuel injection pressure control for the acceleration operation. Specifically, an amount of the internal EGR is increased by advancing the valve closing timing of the exhaust valve, so that, even in the fuel-rich state in the cylinder, vaporization of the fuel is promoted and thereby an amount of PM emission is suppressed. However, response delay exists in the variable valve (exhaust valve) control, and hence it takes about several cycles or several hundred milliseconds until the exhaust valve is closed, that is, until an amount of the internal EGR reaches the target value. Thus, another measure is necessary for suppressing an amount of PM emission during this period. Therefore, when it is determined that the accelerator opening degree is increased and acceleration operation is initiated, the ECU 20 advances the valve closing timing of the exhaust valve and increases the fuel injection pressure. The fuel injection pressure is controlled by the high pressure fuel pump, and the control response of the high pressure fuel pump is fast. Thus, it is possible to perform high-speed control of the fuel injection pressure per a cycle unit. With this control, even during response delay period of the exhaust valve (an amount of the internal EGR) in an initial acceleration stage, the fuel is atomized by increasing the fuel injection pressure, and thereby vaporization of the fuel is promoted, so that an amount of PM emission can be suppressed. Further, the ECU 20 controls the fuel pressure so that the above-described range of increase in the fuel pressure is reduced as the present valve closing timing of the exhaust valve approaches the target value. With this control, it becomes possible to suppress the period required to increase the fuel pressure for suppressing an amount of PM emission to requisite minimum, so that it is possible to reduce the deterioration of fuel economy due to the increase in the drive force of the high pressure fuel pump.

Figure 8:
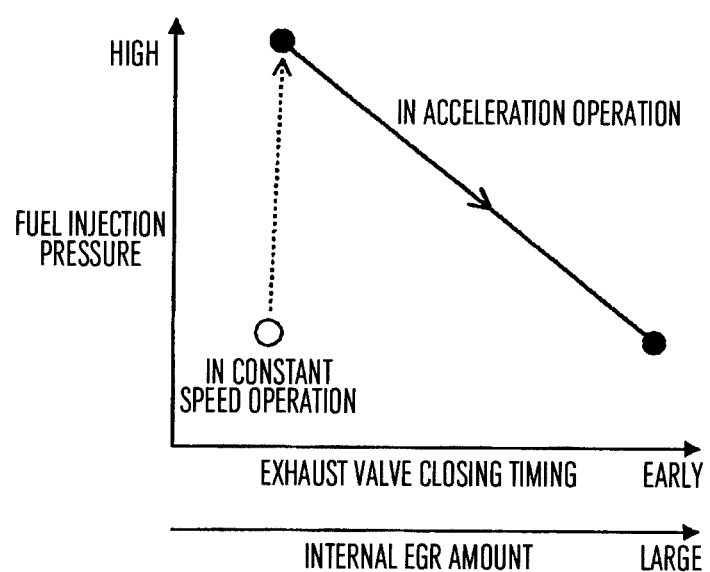
FIG. 8 is a view showing relationship between exhaust valve closing timing and fuel injection pressure at the time of acceleration operation in the control apparatus of the direct injection gasoline engine according to the first embodiment of the present invention.

FIG. 8 shows relationship between the valve closing timing of the exhaust valve and the fuel injection pressure at the time of acceleration operation in the control apparatus of the direct injection gasoline engine according to the first embodiment of the present invention. The fuel injection pressure necessary for reducing an amount of PM emission to a desired value or less at the time of acceleration operation is shown (by the solid line in the drawing) for each valve closing timing of the exhaust valve (for each amount of the internal EGR). Therefore, when an amount of the internal EGR is small (the valve closing timing of the exhaust valve is late), since the temperature in the cylinder is low and hence vaporization characteristics of the fuel are poor, it is necessary to atomize the fuel by greatly increasing the fuel pressure. On the contrary, when an amount of the internal EGR is large (the valve closing timing of the exhaust valve is early), since the temperature in the cylinder is high and hence sufficient vaporization characteristics of the fuel can be obtained, it is not necessary to increase the fuel pressure. Here, transitions of the exhaust valve closing timing and of the fuel injection pressure at the time when the operation of the vehicle is shifted from constant speed operation to acceleration operation are shown by the arrows in the drawing. At the time of constant speed operation, the valve closing timing of the exhaust valve is set to a retard angle side, and the fuel injection pressure is set to a low pressure side. When an acceleration operation is initiated, control to advance the valve closing timing of the exhaust valve and to increase the fuel injection pressure is performed. However, because of response delay of the exhaust valve, a range of increase in the fuel pressure is set to a large value at the beginning. The range of increase in the fuel pressure is reduced as the valve closing timing of the exhaust valve approaches the target value.

As described above, according to the present embodiment, the vaporization characteristics of the fuel during acceleration operation are improved in such a manner that, at the time of acceleration operation, the valve closing timing of the exhaust valve is advanced and further the fuel injection pressure is increased in accordance with the present exhaust valve closing timing. Thereby, it is possible to suppress an amount of PM emission while suppressing deterioration of fuel consumption to minimum.

Next, structure and operation of a control apparatus of a direct injection gasoline engine according to a second embodiment of the present invention will be described with reference to FIG. 9 to FIG. 14.

Figure 9:
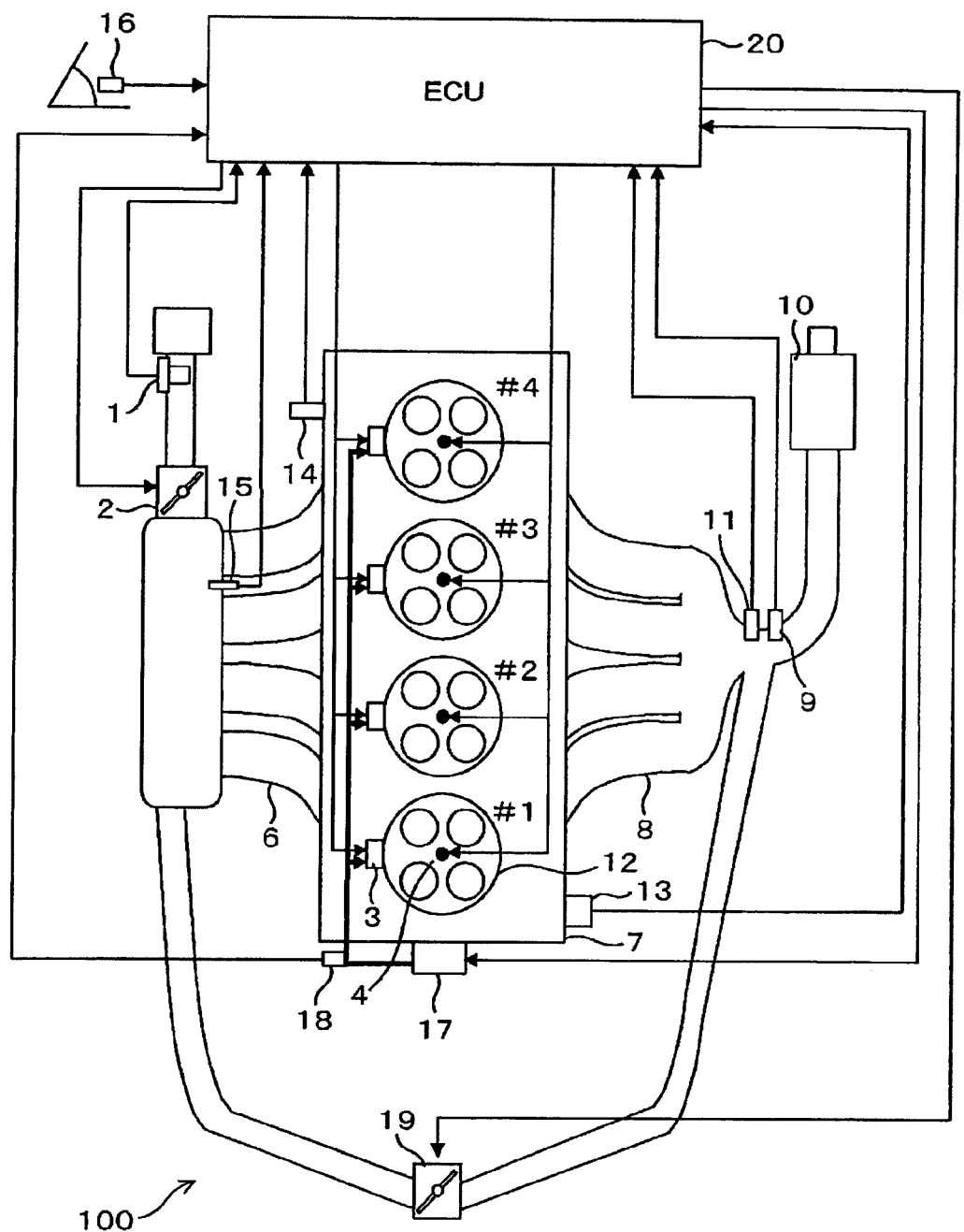
FIG. 9 is a view showing a configuration of a system in which a control apparatus of a direct injection gasoline engine according to a second embodiment of the present invention is applied to a gasoline engine for an automobile.

FIG. 9 is a view showing configuration of a system in which the control apparatus of a direct injection gasoline engine according to a second embodiment is applied to a multi-cylinder gasoline engine for an automobile. Instead of the variable valve 5 in the system configuration of the first embodiment shown in FIG. 1, a bypass passage is provided between an exhaust pipe and an intake pipe in the present embodiment, and an EGR valve 19 for controlling an amount of exhaust gas flowing into the intake pipe is provided in the passage. Further, the position of the intake air temperature sensor 15 is changed to a down stream side of the throttle valve (in the flow passage of the intake pipe between the throttle valve and the suction valve).

Figure 10:
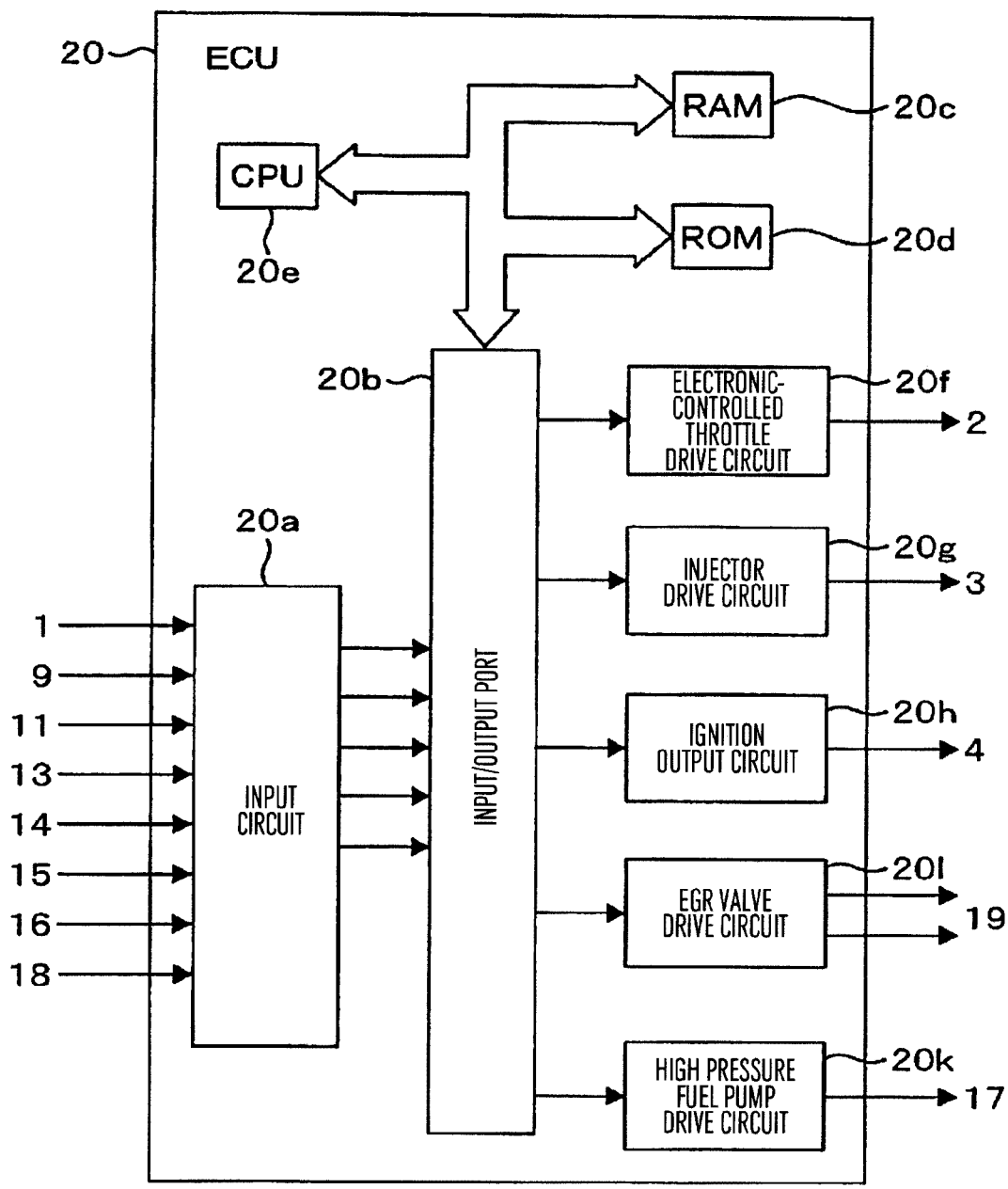
FIG. 10 is a system block diagram showing a configuration of the control apparatus of the direct injection gasoline engine according to the second embodiment of the present invention.

FIG. 10 is a system block diagram showing a configuration of the control apparatus of the direct injection gasoline engine according to the present embodiment. The configuration according to the present embodiment is basically the same as the configuration of the control apparatus of the direct injection gasoline engine according to the first embodiment of the present invention shown in FIG. 2, but is featured in that an EGR valve driving circuit 20i is provided instead of the variable valve drive circuit 20j.

Further, the behavior of an air amount and a fuel amount (actual air-fuel ratio) at the time of acceleration operation in the control apparatus of the direct injection gasoline engine according to the present embodiment is the same as that shown in FIG. 4.

Next, a control method of the EGR valve and the fuel injection pressure in the control apparatus of the direct injection gasoline engine according to the present embodiment will be described with reference to FIG. 11 to FIG. 14.

First, a basic principle of the method for reducing an amount of PM emission in the control apparatus of the direct injection gasoline engine according to the present embodiment is described with reference to FIG. 11.

Figure 11:
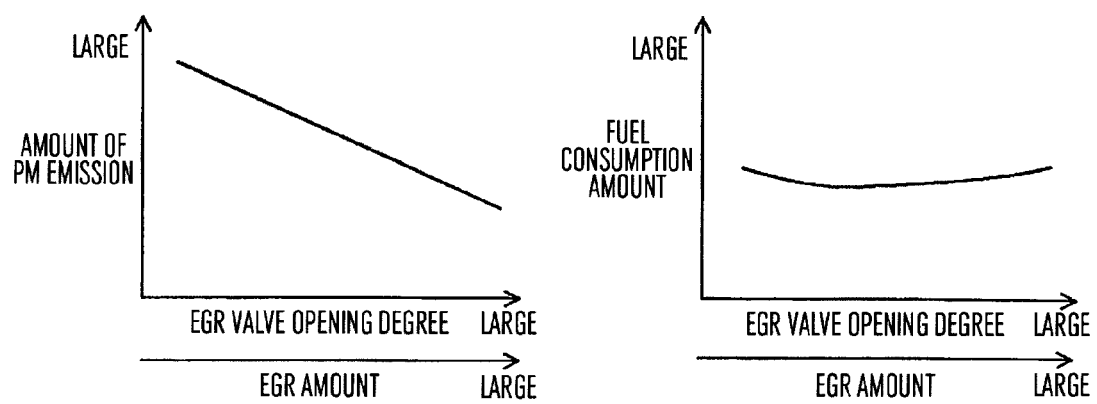
FIG. 11 is a view showing basic principle of PM reduction method in the control apparatus of the direct injection gasoline engine according to the second embodiment of the present invention.

FIG. 11 is a view showing relationship between the EGR valve opening degree and each of an amount of PM emission and a fuel consumption amount. When the EGR valve opening degree is increased, an amount of the exhaust gas (EGR amount) flowing into the intake pipe from the exhaust pipe is increased, so that temperature of gas in the cylinder is increased. When the temperature of the gas in the cylinder is increased, vaporization of the fuel injected into the cylinder is promoted, so that an amount of fuel adhesion and local fuel-rich regions are reduced. Therefore, as shown in FIG. 11 (left view), an amount of PM emission is reduced by increasing the EGR valve opening degree. The EGR amount is increased by increasing the EGR valve opening degree. When the EGR amount is increased, "the reduction of pumping loss" which leads to improvement in fuel consumption, and "the reduction in the combustion speed due to increase in an amount of inert gas", which leads to deterioration of fuel consumption, are simultaneously caused. When the two effects are combined with each other, the relationship between the exhaust valve closing timing and the fuel consumption amount becomes as shown in FIG. 11 (right view).

Note that the relationship between fuel injection pressure and each of an amount of PM emission and fuel consumption amount in the present embodiment is the same as that in the first embodiment shown in FIG. 5.

Next, contents of control of the EGR valve and the fuel injection pressure in the control apparatus of the direct injection gasoline engine according to the present embodiment will be described with reference to FIG. 12.

Figure 12:
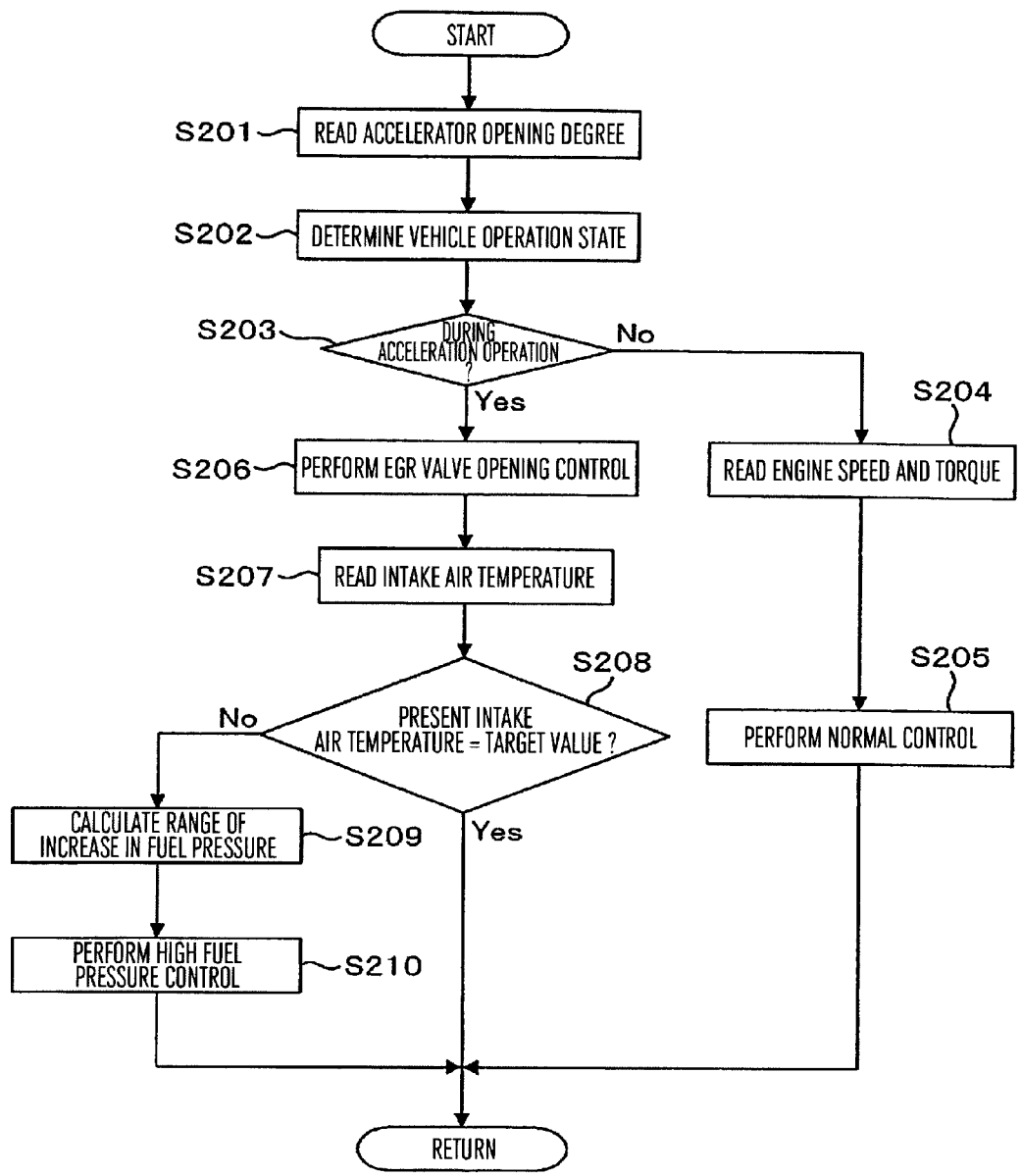
FIG. 12 is a flow chart showing contents of control of an EGR valve and fuel pressure at the time of acceleration operation in the control apparatus of the direct injection gasoline engine according to the second embodiment of the present invention.

FIG. 12 is a flow chart showing the contents of control of the EGR valve and the fuel injection pressure in the control apparatus of the direct injection gasoline engine according to the second embodiment of the present invention. The contents of the control shown in FIG. 12 are performed by the ECU 20 repeatedly at predetermined intervals.

In step S201, the ECU 20 reads a present value of the accelerator opening degree sensor 16. Next, in step S202, on the basis of the present value of the accelerator opening degree sensor 16, the ECU 20 determines present operation state of the vehicle. For example, when the present accelerator opening degree is a predetermined accelerator opening degree or larger, the ECU 20 determines the present operation state as acceleration operation state, while when the present accelerator opening degree is a predetermined accelerator opening degree or less, the ECU 20 determines the present operation state as constant speed operation state or deceleration operation state. In the above, an example is described, in which the vehicle operation state is determined on the basis of the accelerator opening degree. Alternatively, the vehicle operation state may also be determined on the basis of the vehicle speed and the intake pipe pressure.

Next, in step S203, the ECU 20 determines whether or not the present operation state of the vehicle is in acceleration operation state. When the present operation state of the vehicle is not in acceleration operation state (that is, in constant speed operation state or deceleration operation state), the ECU 20 proceeds to step S204, and reads information about present engine operating conditions (engine speed, required engine torque, and the like). Then, the ECU 20 proceeds to step S205 to perform normal control. The normal control is control in which the control value of each of the devices (the EGR valve and the high pressure fuel pump) is read from a predetermined map, and the like, by using the engine speed, the engine torque, and the like, and the devices are controlled on the basis of the control values.

When in step S203 it is determined that the present operation state of the vehicle is in acceleration operation state, the ECU 20 proceeds to step S206 and performs control to advance the valve opening timing of the EGR valve to increase the EGR amount. A target EGR valve opening degree is determined by the accelerator opening degree, the engine speed, and the like.

Next, in step S207, the ECU 20 reads present intake air temperature detected by the intake air temperature sensor. Here, after the EGR valve opening degree is changed, the EGR amount is changed with a fixed delay proportional to a volume of the bypass passage, and hence the EGR valve opening degree does not necessarily represent the EGR amount at the time of acceleration operation. The intake air temperature is increased as the EGR amount is increased, and hence the intake air temperature is used as an indicator of the EGR amount at the time of acceleration operation.

When the ECU 20 determines in step S208 that the present intake air temperature (≈the EGR amount) has not reached the target value yet, that is, the control state is in response delay period of EGR, the ECU 20 proceeds to step S209, and calculates a range of increase in the fuel pressure necessary for compensating the response delay of EGR. The range of increase in the fuel pressure can be calculated mainly from the present intake air temperature (that is, the present EGR amount). Then, the ECU 20 proceeds to step S210 and performs the high fuel pressure control on the basis of the above-described range of increase in the fuel pressure. When the ECU 20 determines in step S208 that the present intake air temperature has already reached the target value, the ECU 20 terminates the control without performing a series of fuel pressure increase control operations.

Next, contents of the control of the EGR valve and the fuel injection pressure at the time of acceleration operation in the control apparatus of the direct injection gasoline engine according to the present embodiment will be described in detail with reference to FIG. 13 and FIG. 14.

Figure 13:
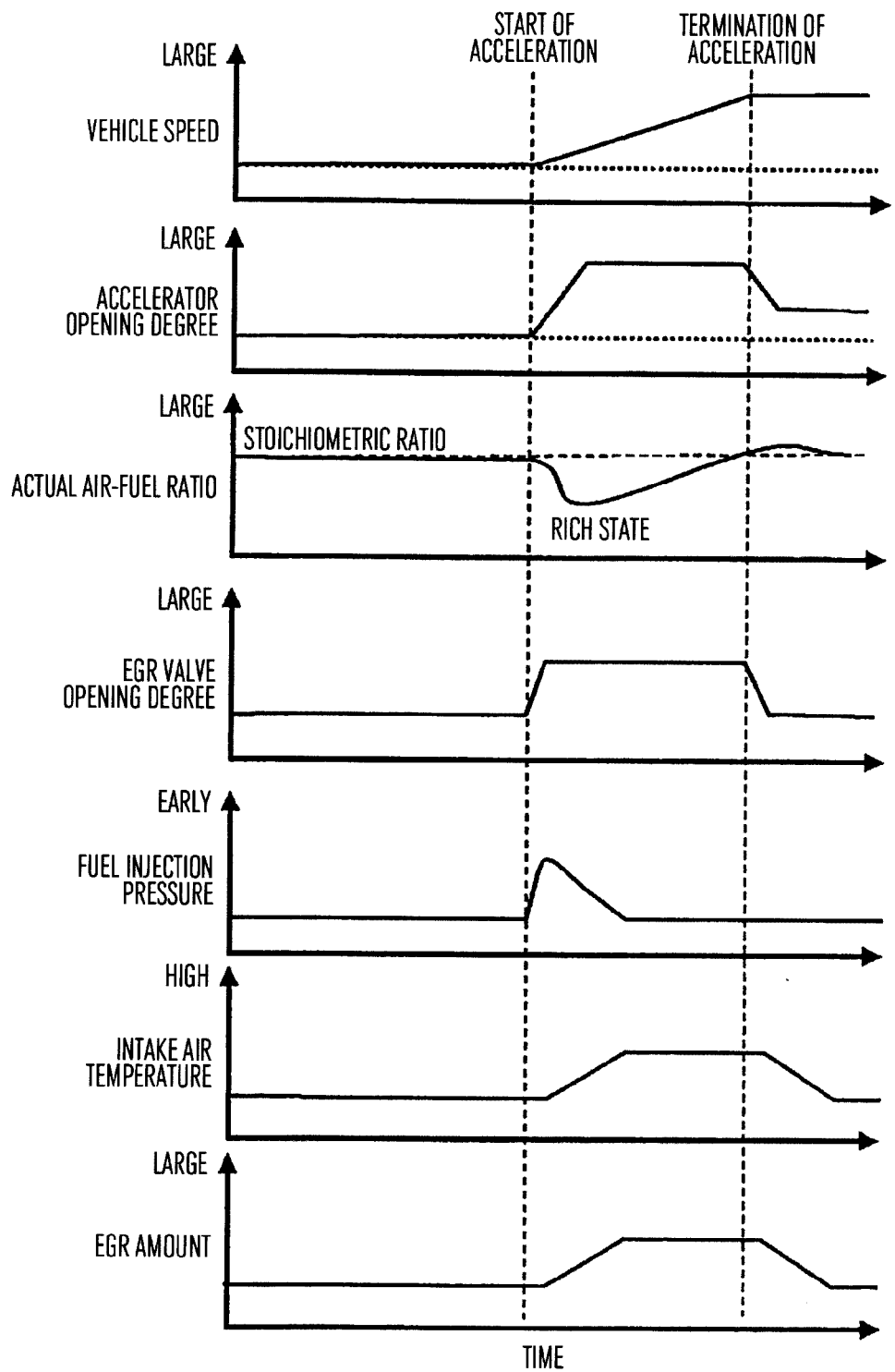
FIG. 13 is a time chart of control of the EGR valve the fuel pressure at the time of acceleration operation in the control apparatus of the direct injection gasoline engine according to the second embodiment of the present invention.

FIG. 13 shows a time chart of the control of the EGR valve and the fuel injection pressure at acceleration operation in the control apparatus of the direct injection gasoline engine according to the second embodiment of the present invention. In FIG. 13, time-based changes of the vehicle speed, the accelerator opening degree, the actual air-fuel ratio, the EGR opening degree, the fuel injection pressure, the intake air temperature, and the EGR amount are shown in order from the top. At the time of constant speed operation, normal EGR valve control and normal fuel injection pressure control are performed in accordance with the engine speed and the engine torque. Thereafter, when the driver depresses the accelerator pedal, the accelerator opening degree is increased, so that the vehicle is accelerated. At acceleration operation, it is difficult to maintain the air-fuel ratio in the cylinder at a constant level as described above, and hence the actual air-fuel ratio in the cylinder is shifted to a rich side as shown in FIG. 13. When it is determined that the accelerator opening degree is increased and an acceleration operation is initiated, the ECU 20 starts the EGR valve control and the fuel injection pressure control for the acceleration operation. Specifically, the ECU 20 increases the EGR amount by increasing the opening degree of the EGR valve, so that, even in the fuel-rich state in the cylinder, vaporization of the fuel is promoted and thereby an amount of PM emission is suppressed. However, response delay proportional to a volume of the EGR bypass passage exists in the control of the EGR amount, and hence it takes about several tens milliseconds to several hundred milliseconds until the EGR amount (here, the value from the intake air temperature sensor is used as an indicator of the EGR amount) reaches the target value. Thus, another measure is necessary for suppressing an amount of PM emission during this period. Therefore, when the ECU 20 determines that the accelerator opening degree is increased and acceleration operation is initiated, the ECU 20 increases the opening degree of the EGR valve and increases the fuel injection pressure. The fuel injection pressure is controlled by the high pressure fuel pump, and the control response of the high pressure fuel pump is fast. Thus, it is possible to perform the high-speed control of the fuel injection pressure per a cycle unit. With this control, even during the response delay period of the EGR amount in the initial acceleration stage, the fuel is atomized by increasing the fuel injection pressure. Thereby, vaporization of the fuel is promoted, so that an amount of PM emission can be suppressed. Further, the ECU 20 controls the fuel pressure so that the above-described range of increase in the fuel pressure is reduced as the present intake air temperature the EGR amount) approaches the target value. With this control, the period required to increase the fuel pressure for suppressing an amount of PM emission can be suppressed to a requisite minimum, so that deterioration of fuel consumption due to increase in the drive force of the high pressure fuel pump can be reduced.

Figure 14:
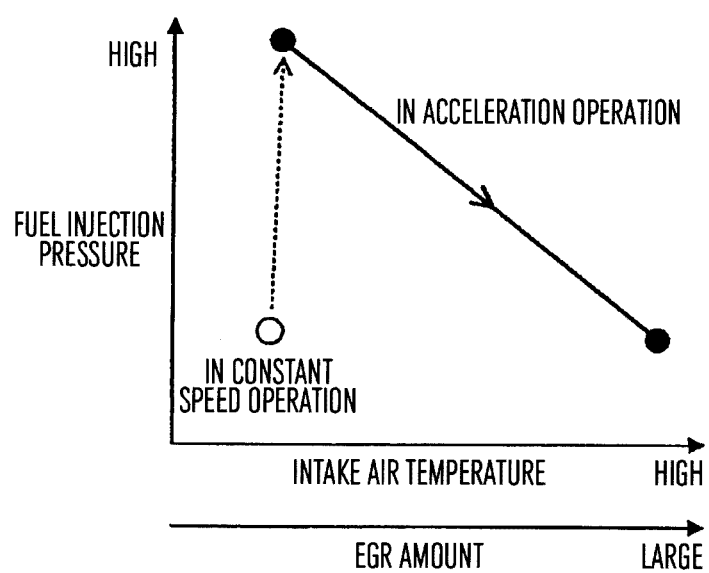
FIG. 14 is a view showing relationship between intake air temperature and fuel injection pressure at the time of acceleration operation in the control apparatus of the direct injection gasoline engine according to the second embodiment of the present invention.

FIG. 14 shows relationship between the intake air temperature and the fuel injection pressure at the time of acceleration operation in the control apparatus of the direct injection gasoline engine according to the second embodiment of the present invention. The fuel injection pressure necessary for reducing an amount of PM emission to a desired value or less at the time of acceleration operation is shown (by the solid line in the drawing) for each intake air temperature the EGR amount). Accordingly, when the EGR amount is small (the intake air temperature is low), the temperature in the cylinder is low and thereby the vaporization characteristics of the fuel are poor, and therefore, it is necessary to atomize the fuel by greatly increasing the fuel pressure. On the contrary, when the EGR amount is large (the intake air temperature is high), the temperature in the cylinder is high and thereby sufficient vaporization characteristics of the fuel can be obtained, and therefore, it is not necessary to increase the fuel pressure. Here, transitions of the intake air temperature and of the fuel injection pressure at the time when the operation of the vehicle is shifted from constant speed operation to acceleration operation are shown by the arrows in the drawing. At the time of constant speed operation, the intake air temperature is set to a lower side (the side of smaller EGR valve opening degree), and the fuel injection pressure is set to a lower pressure side. When acceleration operation is initiated, the control to increase the opening degree of the EGR valve and to increase the fuel injection pressure is performed. However, because of response delay of the intake air temperature (the EGR amount), the range of increase in the fuel pressure is set to a large value at the beginning. The range of increase in the fuel pressure is reduced as the intake air temperature (the EGR amount) approaches the target value.

As described above, according to the present embodiment, at the time of acceleration operation, the opening degree of the EGR valve is increased and further the fuel injection pressure is increased in accordance with the present intake air temperature, so that vaporization characteristics of the fuel during the acceleration operation are improved. Thereby, it is possible to suppress an amount of PM emission while suppressing deterioration of fuel consumption to a minimum.

In the following, configuration and operation of a control apparatus of a direct injection gasoline engine according to a third embodiment of the present invention will be described.

The configuration of the system in which the control apparatus of the direct injection gasoline engine according to the present embodiment is applied to a gasoline engine for an automobile is the same as that shown in FIG. 1.

The configuration of the control apparatus of the direct injection gasoline engine according to the present embodiment is the same as that shown in FIG. 2.

The characteristics of the variable valve in the control apparatus of the direct injection gasoline engine according to the present embodiment are the same as those shown in FIG. 3.

Next, contents of the control of the variable valve (the exhaust valve) and the air-fuel ratio (the fuel injection amount) in the control apparatus of the direct injection gasoline engine according to the present embodiment will be described with reference to FIG. 15 and FIG. 16.

Figure 15:
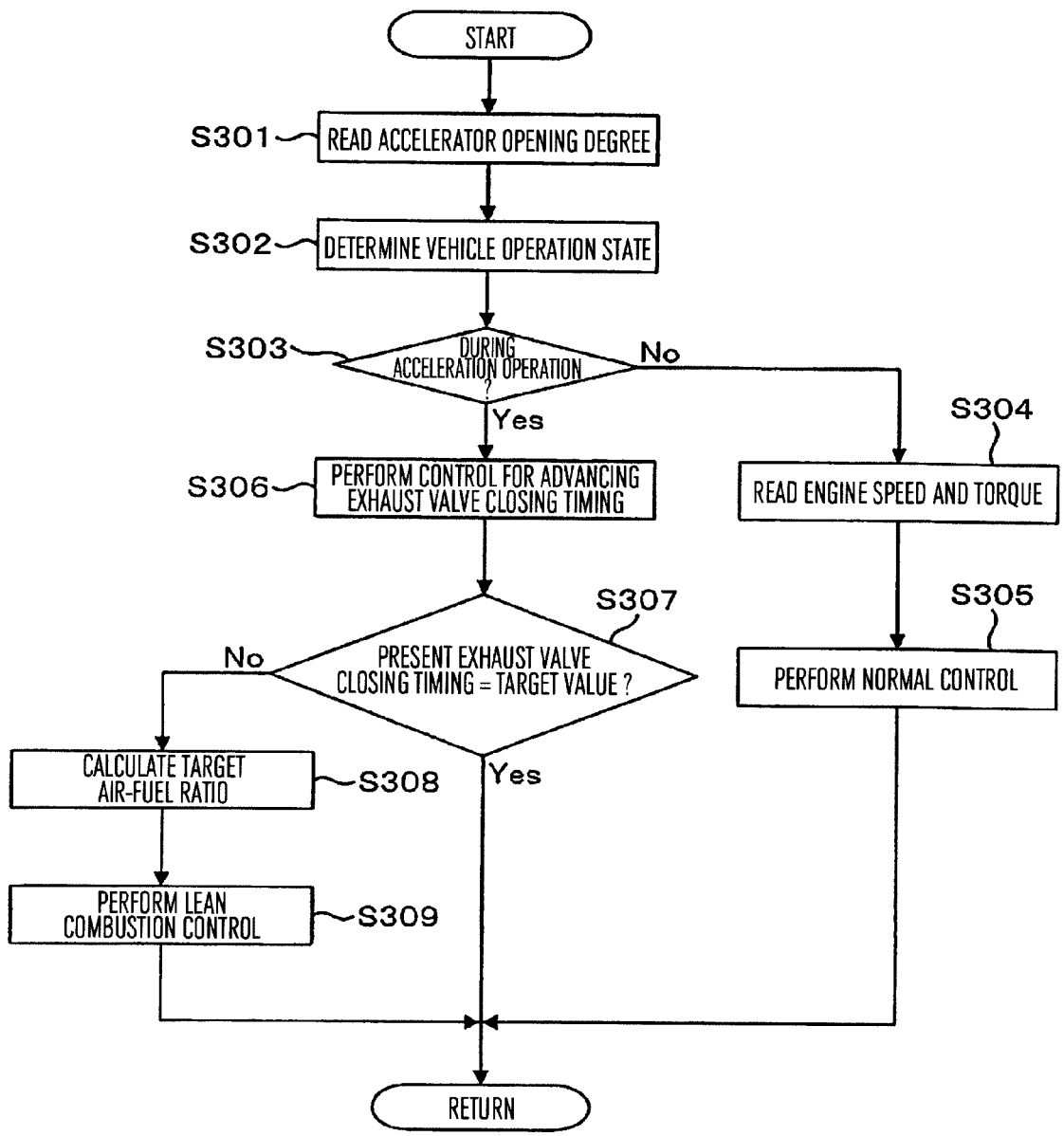
FIG. 15 is a flow chart showing contents of control of a variable valve and air-fuel ratio at the time of acceleration operation in a control apparatus of a direct injection gasoline engine according to a third embodiment of the present invention.

FIG. 15 is a flow chart showing contents of the control of the variable valve and the air-fuel ratio in the control apparatus of the direct injection gasoline engine according to the third embodiment of the present invention. The contents of the control shown in FIG. 15 are performed by the ECU 20 repeatedly at predetermined intervals.

In step S301, the ECU 20 reads a present value of the accelerator opening degree sensor 16. Next, in step S302, on the basis of the present value of the accelerator opening degree sensor 16, the ECU 20 determines the present operation state of the vehicle. For example, when the present accelerator opening degree is a predetermined accelerator opening degree or larger, the ECU 20 determines the present operation state as acceleration operation state, while when the present accelerator opening degree is a predetermined accelerator opening degree or less, the ECU 20 determines the present operation state as constant speed operation state or a deceleration operation state. In the above description, an example is described, in which the vehicle operation state is determined on the basis of the accelerator opening degree. Alternatively, the vehicle operation state may also be determined on the basis of the vehicle speed and the intake pipe pressure.

Next, in step S303, the ECU 20 determines whether or not the present operation state of the vehicle is in acceleration operation state. When the present operation state of the vehicle is not in acceleration operation state (that is, in constant speed operation state or deceleration operation state), the ECU 20 proceeds to step S304, and reads information about the present engine operating conditions (engine speed, required engine torque, and the like). Then, the ECU 20 proceeds to step S305 to perform normal control. The normal control is control in which the control value of each of the devices (the variable valve and the high pressure fuel pump) is read from a predetermined map, and the like, by using the engine speed, the engine torque, and the like, and the devices are controlled on the basis of the control values.

When it is determined in step S303 that the present operation state of the vehicle is in acceleration operation state, the ECU 20 proceeds to step S306 and performs control to advance the valve closing timing of the exhaust valve in order to increase an amount of internal EGR. At this time, in order to increase an amount of internal EGR, it is necessary to further advance the valve closing timing of the exhaust valve with respect to the top dead center. A target valve closing timing of the exhaust valve is determined on the basis of the accelerator opening degree, the engine speed, and the like.

Next, in step S307, the ECU 20 determines whether or not the present valve closing timing of the exhaust valve has reached the target valve closing timing of the exhaust valve. When it is determined in step S307 that the valve closing timing of the exhaust valve has not reached the target value yet, that is, the control state is in the response delay period of the exhaust valve control, the ECU 20 proceeds to step S308 and performs control to set the target air-fuel ratio to a lean side in order to compensate the response delay of the internal EGR. The air-fuel ratio at this time is calculated mainly from the present closing timing of the exhaust valve (that is, a present amount of the internal EGR). Then, the ECU 20 proceeds to step S309 and performs lean combustion control on the basis of the above-described target air-fuel ratio. When it is determined in step S307 that the valve closing timing of the exhaust valve has reached the target value, the ECU 20 terminates the control without performing a series of the lean combustion control operations.

Figure 16:
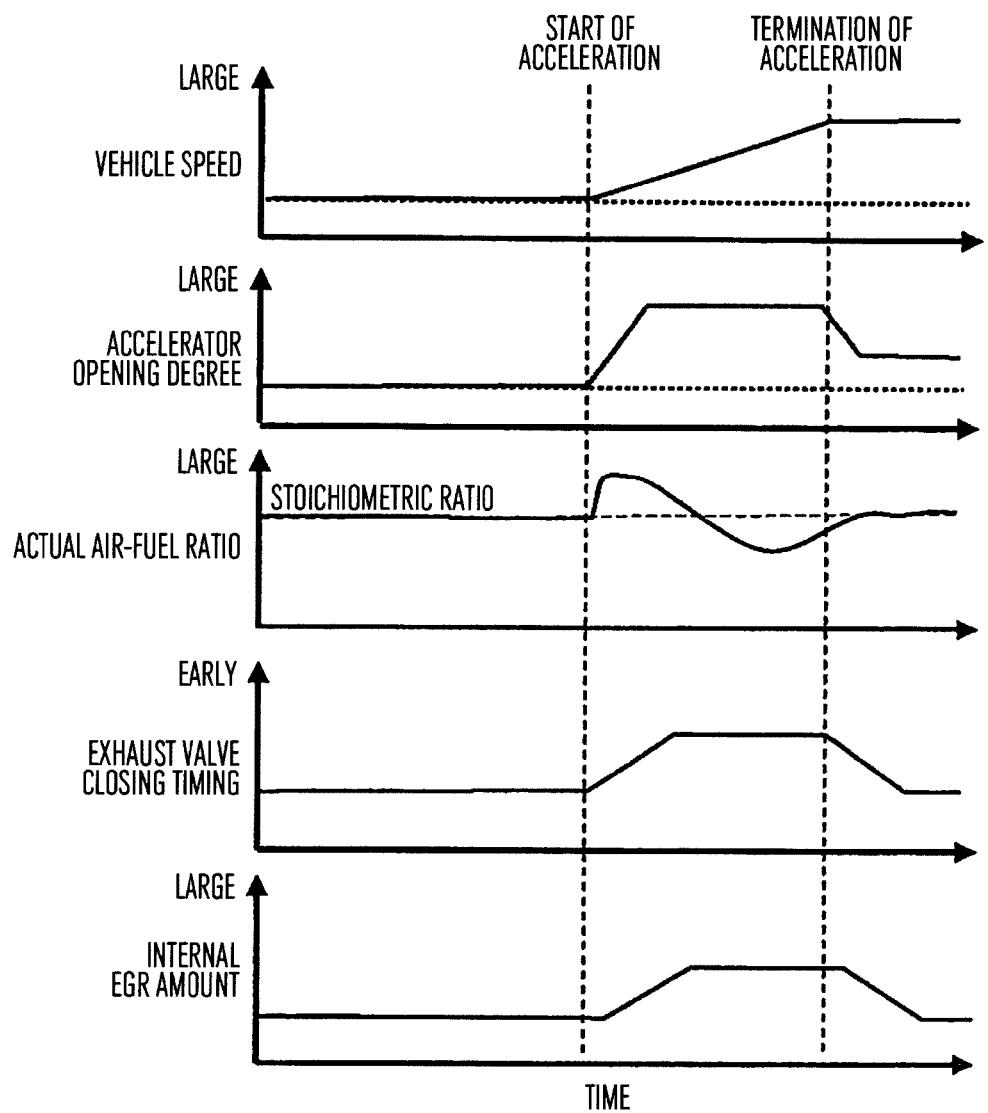
FIG. 16 is a time chart of control of a variable valve and fuel-air ratio at the time of acceleration operation in the control apparatus of the direct injection gasoline engine according to the third embodiment of the present invention.

FIG. 16 shows a time chart of the control of the variable valve (the exhaust valve closing timing) and the air-fuel ratio at the time of acceleration operation in the control apparatus of the direct injection gasoline engine according to the third embodiment of the present invention. In FIG. 16, time-based changes of the vehicle speed, the accelerator opening degree, the actual air-fuel ratio, the exhaust valve closing timing, and an amount of the internal EGR are shown in order from the top. At the time of constant speed operation, the normal exhaust valve control and the normal air-fuel ratio control (in which the air-fuel ratio is set to a stoichiometric ratio) are performed in accordance with the engine speed and the engine torque. Thereafter, when a driver depresses the accelerator pedal, the accelerator opening degree is increased, so that the vehicle is accelerated. At the time of acceleration operation, it is difficult to maintain the air-fuel ratio in the cylinder at a constant level as described above. Thus, when the air-fuel ratio is intended to be controlled to the stoichiometric ratio, actual air-fuel ratio in the cylinder is shifted to a rich side. When the ECU 20 determines that the accelerator opening degree is increased and acceleration operation is initiated, the ECU 20 starts the variable valve control and the air-fuel ratio control for the acceleration operation. Specifically, the ECU 20 increases an amount of the internal EGR by advancing the valve closing timing of the exhaust valve, so that vaporization of the fuel is promoted and thereby an amount of PM emission is suppressed. However, response delay exists in the variable valve (exhaust valve) control, and hence it takes about several cycles to several hundred milliseconds until the exhaust valve is closed, that is, until an amount of the internal EGR reaches the target value. Thus, another measure is needed for suppressing an amount of PM emission during this period. Therefore, when the ECU 20 determines that the accelerator opening degree is increased and acceleration operation is initiated, the ECU 20 advances the valve closing timing of the exhaust valve and controls the fuel injection amount so that the actual air-fuel ratio in the combustion chamber is set to the lean side of the stoichiometric ratio. The control response of the fuel injection amount is fast, and hence the high-speed control of the fuel injection amount can be performed per a cycle unit. With this control, even during the response delay period of the exhaust valve (an amount of the internal EGR) in the initial acceleration stage, an amount of PM emission can be suppressed by performing lean combustion. Further, the ECU 20 controls the air-fuel ratio at the time of acceleration operation so that the air-fuel ratio approaches a theoretical ratio as the present valve closing timing of the exhaust valve approaches the target value. With this control, the period of lean combustion for suppressing an amount of PM emission can be suppressed to a requisite minimum, so that deterioration of the exhaust gas due to deterioration of catalyst performance can be suppressed.

As described above, in the present embodiment, at the time of acceleration operation, the valve closing timing of the exhaust valve is advanced and further the air-fuel ratio is set to the lean side in accordance with the present exhaust valve closing timing. Thereby, vaporization characteristics of the fuel during the acceleration operation are improved, so that an amount of PM emission can be suppressed while deterioration of the exhaust gas is suppressed to a minimum.

In the following, configuration and operation of a control apparatus of a direct injection gasoline engine according to a fourth embodiment of the present invention will be described.

The configuration of the system in which the control apparatus of the direct injection gasoline engine according to the present embodiment is applied to a gasoline engine for an automobile is the same as that shown in FIG. 1.

The configuration of the control apparatus of the direct injection gasoline engine according to the present embodiment is the same as that shown in FIG. 2.

The characteristics of the variable valve in the control apparatus of the direct injection gasoline engine according to the present embodiment are the same as those shown in FIG. 3.

Next, contents of the control of the variable valve (the exhaust valve and the intake valve) in the control apparatus of the direct injection gasoline engine according to the present embodiment will be described with reference to FIG. 17 and FIG. 18.

Figure 17:
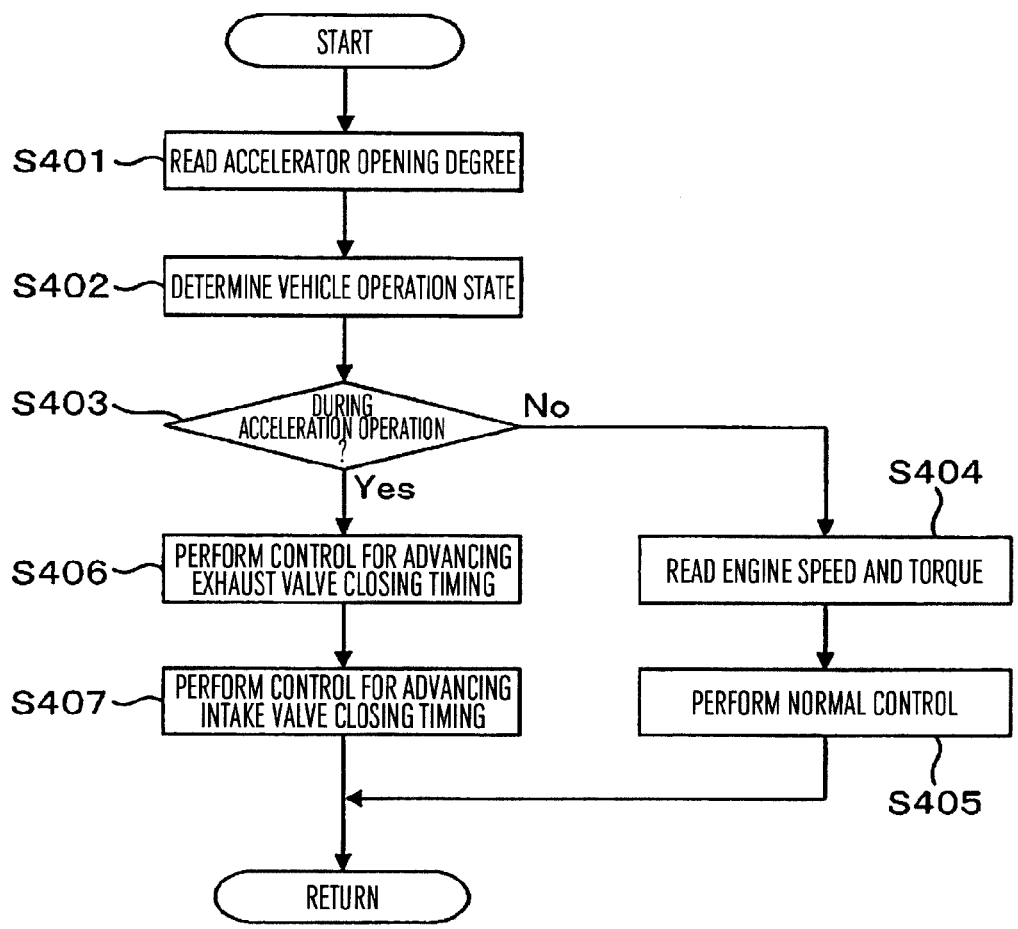
FIG. 17 is a flow chart showing contents of control of a variable valve at the time of acceleration operation in a control apparatus of a direct injection gasoline engine according to a fourth embodiment of the present invention.

FIG. 17 is a flow chart showing contents of the control of the variable valve in the control apparatus of the direct injection gasoline engine according to the fourth embodiment of the present invention. The contents of the control shown in FIG. 17 are performed by the ECU 20 repeatedly at predetermined intervals.

In step S401, the ECU 20 reads a present value of the accelerator opening degree sensor 16. Next, in step S402, on the basis of the present value of the accelerator opening degree sensor, the ECU 20 determines the present operation state of the vehicle. For example, when the present accelerator opening degree is a predetermined accelerator opening degree or larger, the ECU 20 determines the present operation state as acceleration operation state, while when the present accelerator opening degree is a predetermined accelerator opening degree or less, the ECU 20 determines the present operation state as constant speed operation state or a deceleration operation state. In the above description, an example is described, in which the vehicle operation state is determined on the basis of the accelerator opening degree. Alternatively, the vehicle operation state may also be determined on the basis of the vehicle speed and the intake pipe pressure.

Next, in step S403, the ECU 20 determines whether or not the present operation state of the vehicle is in acceleration operation state. When the present operation state of the vehicle is not in acceleration operation state (that is, in constant speed operation state or deceleration operation state), the ECU 20 proceeds to step S404, and reads information about the present engine operating conditions (engine speed, required engine torque, and the like). Then, the ECU 20 proceeds to step S405 to perform normal control. The normal control is control in which control value of each of the devices (the intake and exhaust variable valves) is read from a predetermined map, and the like, by using the engine speed, the engine torque, and the like, and the devices are controlled on the basis of the control values.

When it is determined in step S403 that the present operation state of the vehicle is in acceleration operation state, the ECU 20 proceeds to step S406 and performs control to advance the valve closing timing of the exhaust valve in order to increase an amount of the internal EGR. At this time, in order to increase an amount of the internal EGR, it is necessary to further advance the valve closing timing of the exhaust valve with respect to the top dead center. A target valve closing timing of the exhaust valve is determined on the basis of the accelerator opening degree, the engine speed value, and the like.

Next, in step S407, the ECU 20 performs control to advance the valve closing timing of the intake valve in order to reduce blow-back amount of intake gas. A target valve closing timing of the intake valve is determined by the accelerator opening degree, the engine speed, and the like.

Figure 18:
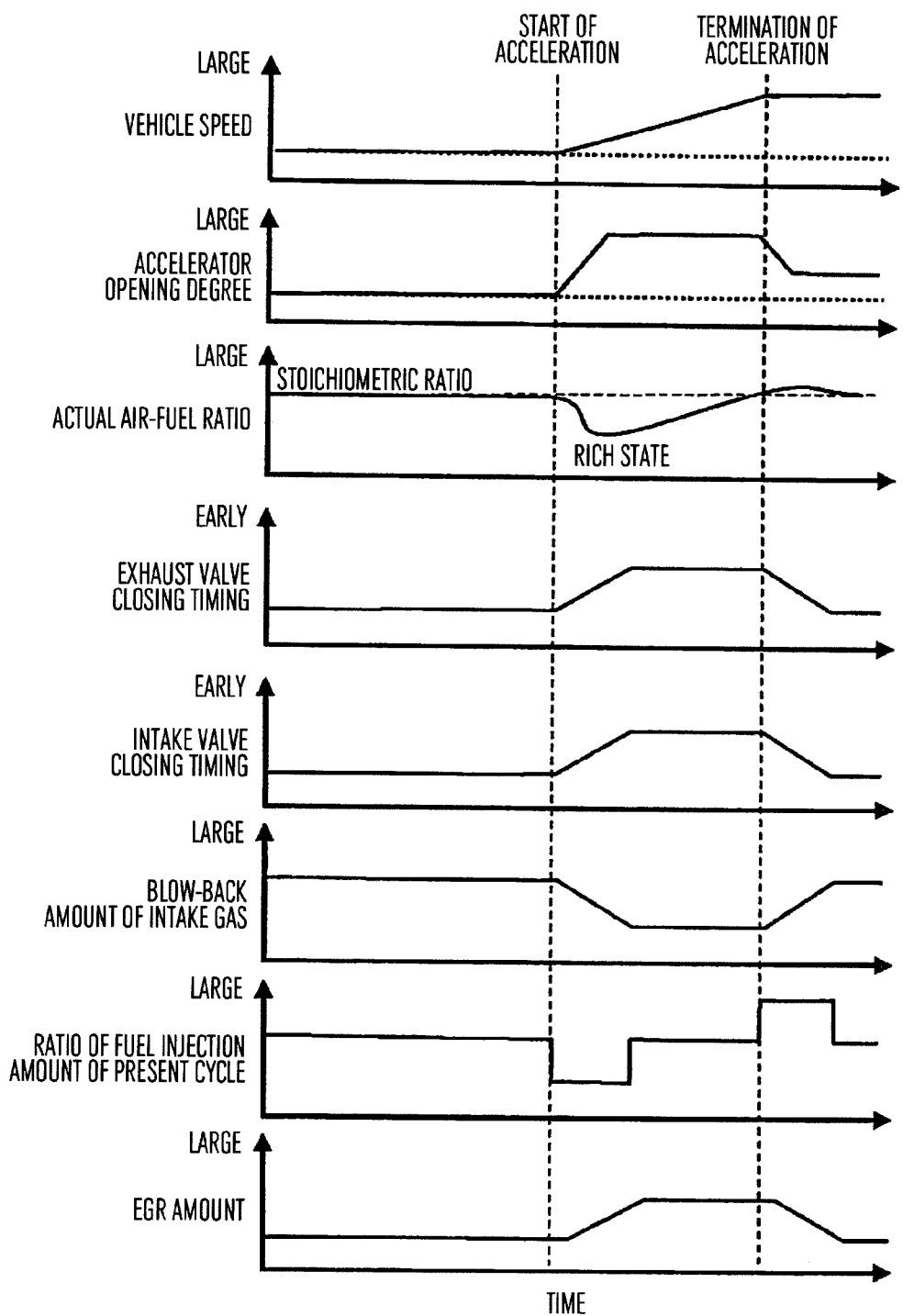
FIG. 18 is a time chart of control of the variable valve at the time of acceleration operation in the control apparatus of the direct injection gasoline engine according to the fourth embodiment of the present invention.

FIG. 18 shows a time chart of the variable valve (the closing timings of the exhaust valve and the intake valve) at the time of acceleration operation in the control apparatus of the direct injection gasoline engine according to the fourth embodiment of the present invention. In FIG. 18, time-based changes of the vehicle speed, the accelerator opening degree, the actual air-fuel ratio, the exhaust valve closing timing, the intake valve closing timing, the blow-back amount of the intake gas, the fuel injection ratio of the present cycle, and the amount of the internal EGR are shown in order from the top. At the time of constant speed operation, the normal exhaust valve control and the normal intake valve control are performed in accordance with the engine speed and the engine torque. Thereafter, when a driver depresses the accelerator pedal, the accelerator opening degree is increased, so that the vehicle is accelerated. At the time of acceleration operation, it is difficult to maintain the air-fuel ratio in the cylinder at a constant level as described above. Thus, when the air-fuel ratio is controlled to the theoretical ratio, the actual air-fuel ratio in the cylinder is shifted to a rich side. When it is determined that the accelerator opening degree is increased and acceleration operation is initiated, the ECU 20 starts the variable valve control for the acceleration operation. Specifically, the ECU 20 increases an amount of the internal EGR by advancing the valve closing timing of the exhaust valve, so that vaporization of the fuel is promoted and thereby an amount of PM emission is suppressed. However, response delay exists in the variable valve (exhaust valve) control, and hence it takes about several cycles to several hundred milliseconds until the exhaust valve is closed, that is, until an amount of the internal EGR reaches the target value. Thus, another measure is necessary for suppressing an amount of PM emission during this period. Therefore, when it is determined that the accelerator opening degree is increased and acceleration operation is initiated, the ECU 20 advances the closing timing of the exhaust valve and advances the closing timing of the intake valve.

Here, details of the intake valve control in the present embodiment are described. At the time of normal control (except the time of acceleration operation), the closing timing of the intake valve is set to a timing after the bottom dead center (about 40 degrees ABDC). For this reason, a part of the gas (air-fuel mixture) once introduced into the combustion chamber is discharged again into the intake pipe until the intake valve is closed (blow-back of the intake gas). The blown-back gas is used for combustion of the next cycle. Therefore, a part of the fuel injected in the present cycle is used as the fuel for the next cycle. That is, "an amount of the fuel used for combustion in the present cycle" can be represented by the expression: "an amount of the fuel included in the blow-back portion in the preceding cycle"+"fuel injection amount in the present cycle"−"an amount of the fuel included in the blow-back portion in the present cycle". In the steady state (in the state where the intake valve closing timing is fixed), "an amount of the fuel included in the blow-back portion in the preceding cycle" is equal to "an amount of the fuel included in the blow-back portion in the present cycle", and hence "an amount of the fuel used for combustion in the present cycle" is equal to "a fuel injection amount in the present cycle". Thus, in the present embodiment, in order to reduce "a fuel injection amount in the present cycle" as much as possible at the time of acceleration operation, particularly in an early stage of the acceleration operation, the valve closing timing of the intake valve is advanced in the early stage of acceleration operation. During the period in which the valve closing timing of the intake valve is advanced, "an amount of the fuel included in the blow-back portion in the preceding cycle" is larger than "an amount of the fuel included in the blow-back portion in the present cycle". Thus, "a fuel injection amount in the present cycle" can be reduced by the difference in amount of the fuel included in the blow-back portion between the preceding cycle and the present cycle. When ratio of "an amount of the fuel injected in the present cycle" to "an amount of the fuel used for combustion in the present cycle" is defined as "ratio of the fuel injection amount in the present cycle", "the ratio of the fuel injection amount in the present cycle" is proportional to inclination of the change of the valve closing timing of the intake valve as shown in FIG. 18. With this control, even during the response delay period of the exhaust valve (an amount of the internal EGR) in the initial acceleration stage, the fuel injection amount of the present cycle required for combustion is reduced, so that an amount of fuel adhesion is reduced and uniformity of air-fuel mixture is improved. Thereby, an amount of PM emission can be suppressed.

As described above, in the present embodiment, at the time of acceleration operation, the closing timing of the exhaust valve is advanced and further the closing timing of the intake valve is advanced, so that, during the acceleration operation, an amount of fuel adhesion is reduced and vaporization characteristics of the fuel are improved. Thereby, an amount of PM emission can be suppressed without deterioration of fuel consumption.

In the following, configuration and operation of a control apparatus of a direct injection gasoline engine according to a fifth embodiment of the present invention will be described with reference to FIG. 19 to FIG. 23.

First, configuration of system in which a control apparatus of a direct injection gasoline engine according to the present embodiment is applied to a gasoline engine for a hybrid automobile will be described with reference to FIG. 19.

Figure 19:
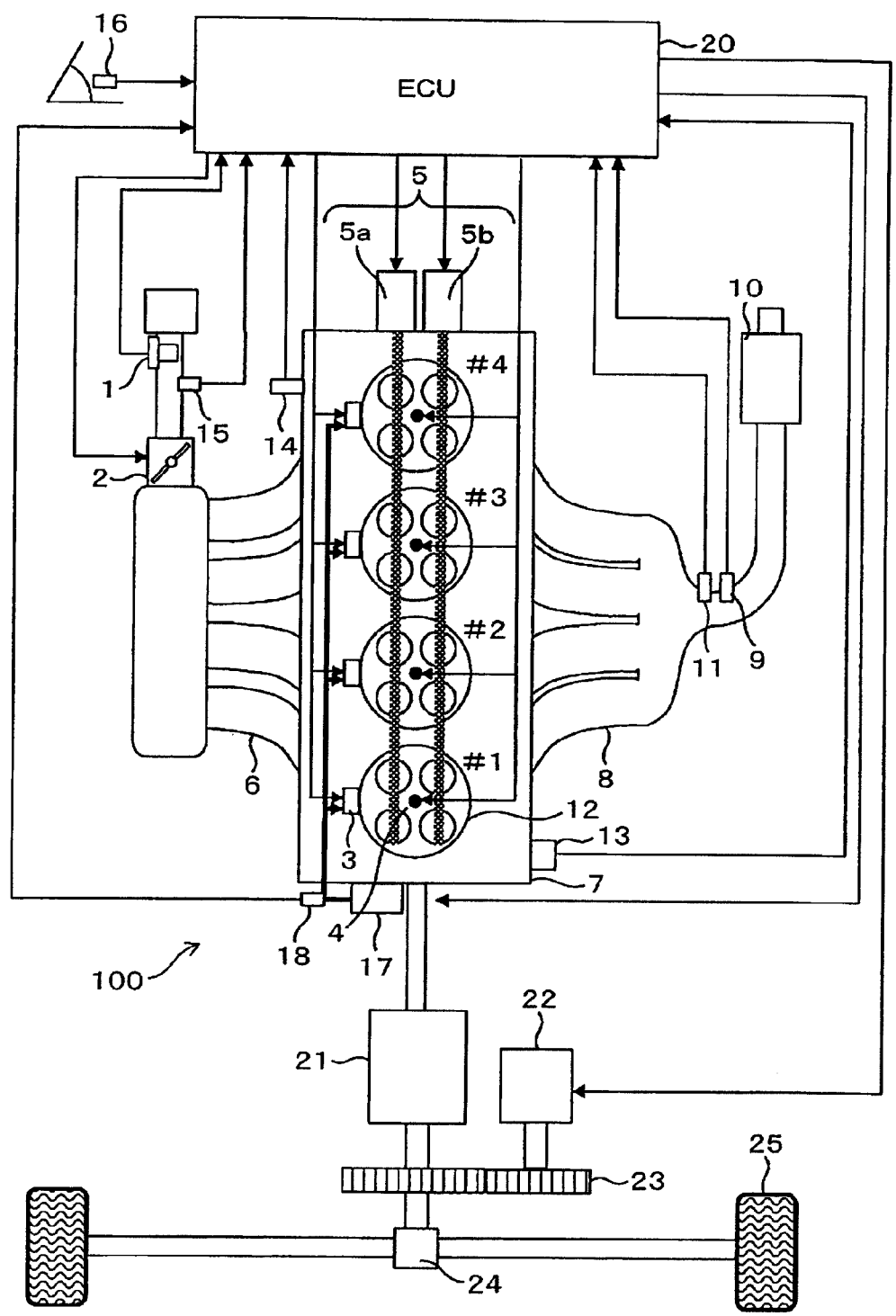
FIG. 19 is a view showing configuration of system in which a control apparatus of a direct injection gasoline engine according to a fifth embodiment of the present invention is applied to a gasoline engine for a hybrid automobile.

FIG. 19 is a view showing configuration of system in which a control apparatus of a direct injection gasoline engine according to a fifth embodiment of the present invention is applied to a gasoline engine for a hybrid automobile. In addition to the system of the first embodiment shown in FIG. 1, a transmission 21 is connected to an output shaft of the engine, and further a motor 22 is connected to an output shaft of the transmission via a gear 23 for the motor. Further, the output shaft of the transmission is connected to wheels 25 via a reduction gear 24. The ECU 20 calculates motor drive force in accordance with the operating state of the vehicle. The calculated motor drive force is sent to the motor 22 as a motor drive signal.

Next, configuration of the control apparatus of the direct injection gasoline engine according to the present embodiment will be described with reference to FIG. 20.

Figure 20:
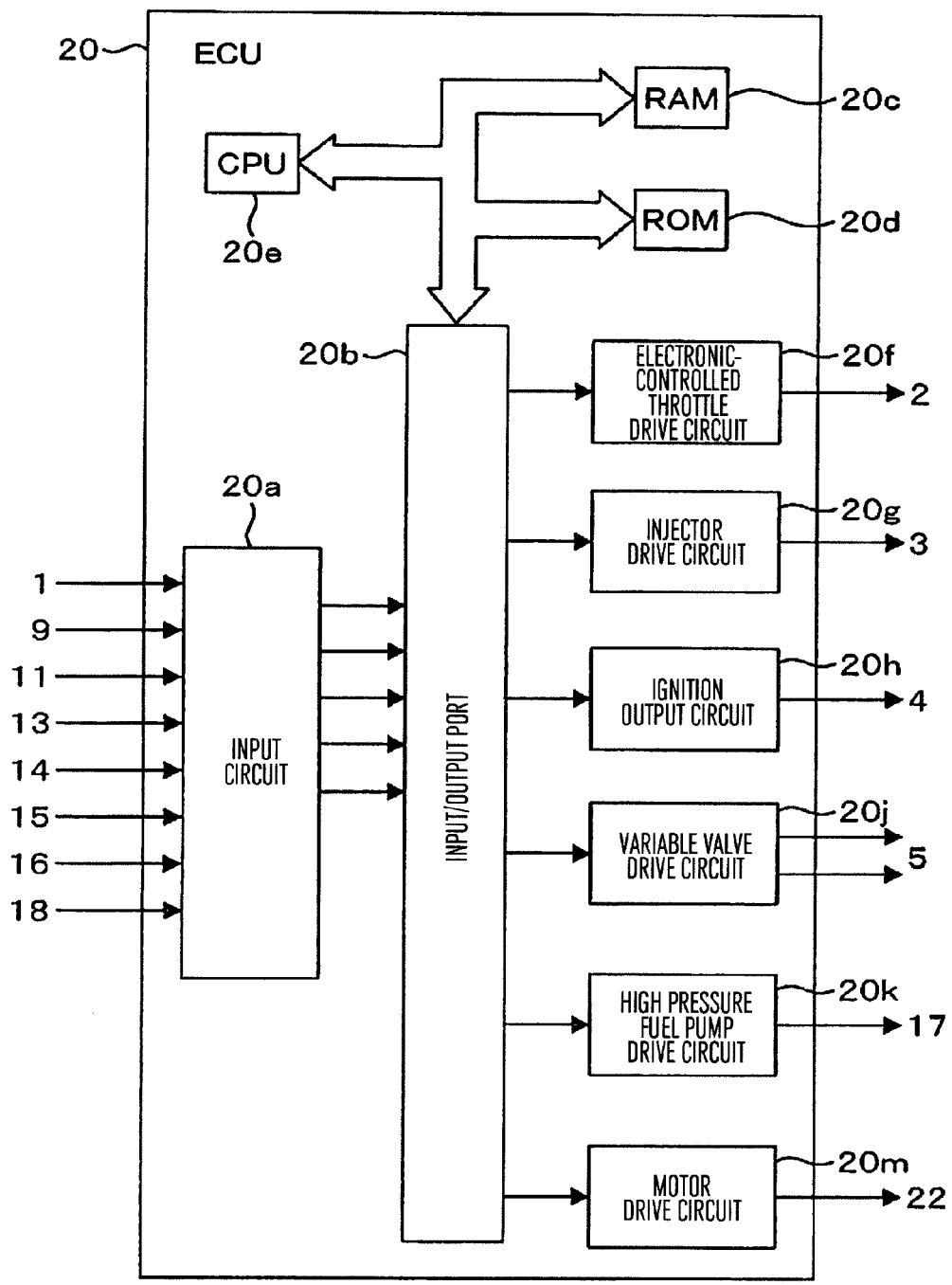
FIG. 20 is a system block diagram showing configuration of the control apparatus of the direct injection gasoline engine according to the fifth embodiment of the present invention.

FIG. 20 is a system block diagram showing the configuration of the control apparatus of the direct injection gasoline engine according to the fifth embodiment of the present invention. In addition to the configuration of the first embodiment shown in FIG. 2, a motor drive circuit 20m is provided as a drive circuit in the present embodiment. The motor drive circuit 20m controls the motor 22.

The ECU 20 makes the motor 22 and the engine 100 generate drive force required for driving the vehicle. In particular, at the time of acceleration operation in which an amount of the internal EGR is increased by advancing the valve closing timing of the exhaust valve, reduction in the drive force of the engine due to increase in an amount of the internal-EGR is compensated by increasing the drive force of the motor.

The characteristics of the variable valve in the control apparatus of the direct injection gasoline engine according to the present embodiment are the same as those shown in FIG. 3.

The behavior of an air amount and a fuel amount at the time of acceleration operation in the control apparatus of the direct injection gasoline engine according to the present embodiment is the same as that shown in FIG. 4.

A basic principle of the method for reducing an amount of PM emission in the control apparatus of the direct injection gasoline engine according to the present embodiment is the same as that shown in FIG. 5.

Figure 21:
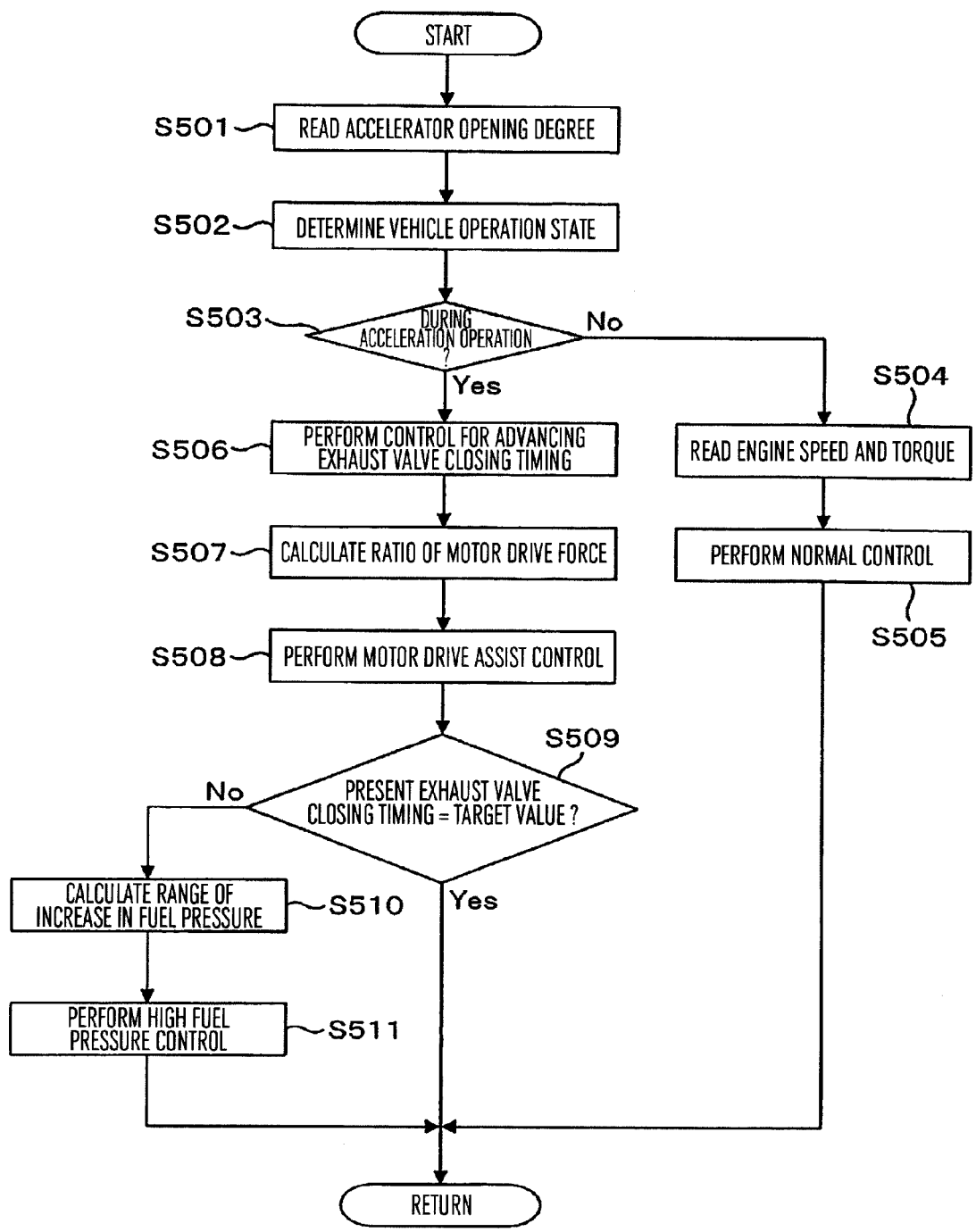
FIG. 21 is a flow chart showing contents of control of a variable valve, fuel pressure, and motor drive force at the time of acceleration operation in the control apparatus of the direct injection gasoline engine according to the fifth embodiment of the present invention.

Next, contents of the control of the variable valve, the fuel injection pressure, and the motor drive force (motor drive force ratio) in the control apparatus of the direct injection gasoline engine according to the present embodiment will be described with reference to FIG. 21. FIG. 21 is a flow chart showing contents of the control of the variable valve, the fuel injection pressure, and the motor drive force (motor drive force ratio) in the control apparatus of the direct injection gasoline engine according to the fifth embodiment of the present invention. The contents of the control shown in FIG. 21 are performed by the ECU 20 repeatedly at predetermined intervals.

In step S501, the ECU 20 reads a present value of the accelerator opening degree sensor 16. Next, in step S502, on the basis of the present value of the accelerator opening degree sensor 16, the ECU 20 determines the present operation state of the vehicle. For example, when the present accelerator opening degree is a predetermined accelerator opening degree or larger, the ECU 20 determines the present operation state as acceleration operation state, while when the present accelerator opening degree is a predetermined accelerator opening degree or less, the ECU 20 determines the present operation state as constant speed operation or deceleration operation state. In the above description, an example is described, in which the vehicle operation state is determined on the basis of the accelerator opening degree. Alternatively, the vehicle operation state may also be determined on the basis of the vehicle speed and the intake pipe pressure.

Next, in step S503, it is determined whether or not the present operation state of the vehicle is in acceleration operation state. When the present operation state of the vehicle is not in acceleration operation state (that is, in constant speed operation state or deceleration operation state), the ECU 20 proceeds to step S504, and reads information about the present engine operating conditions (engine speed, required engine torque, and the like). Then, the ECU 20 proceeds to step S505 to perform normal control. The normal control is control in which control value of each of the devices (the variable valve and the high pressure fuel pump) is read from a predetermined map, and the like, by using the engine speed, the engine torque, and the like, and the devices are controlled on the basis of the control values.

When it is determined in step S503 that the present operation state of the vehicle is in acceleration operation state, the ECU 20 proceeds to step S506 and performs control to advance the valve closing timing of the exhaust valve in order to increase an amount of the internal EGR. At this time, in order to increase an amount of the internal EGR, it is necessary to further advance the valve closing timing of the exhaust valve with respect to the top dead center. A target valve closing timing of the exhaust valve is determined on the basis of the accelerator opening degree, the engine speed, and the like. Then, the ECU 20 proceeds to step S507 and calculates ratio of the motor drive force required to compensate reduction in the engine drive force due to increase in an amount of the internal EGR. The ratio of the motor drive force is calculated mainly from the present valve closing timing of the exhaust valve (that is, the present amount of the internal EGR). Then, the ECU 20 proceeds to step S508 and performs motor drive assist control on the basis of the above-described ratio of the motor drive force. Next, in step S509, the ECU 20 determines whether or not the present valve closing timing of the exhaust valve has reached the target valve closing timing of the exhaust valve. When it is determined in step S509 that the valve closing timing of the exhaust valve has not reached the target value yet, that is, the control state is in the response delay period of the exhaust valve control, the ECU 20 proceeds to step S510 and calculates a range of increase in the fuel pressure required to compensate the response delay of the internal EGR. The range of increase in the fuel pressure can be calculated mainly from the present valve closing timing of the exhaust valve (that is, the present amount of the internal EGR). Then, the ECU 20 proceeds to step S511 and performs high fuel pressure control on the basis of the above-described range of increase in the fuel pressure. When it is determined in step S509 that the valve closing timing of the exhaust valve has reached the target value, the ECU 20 terminates the control without performing a series of fuel pressure increase control operations.

Next, contents of the control of the variable valve and the fuel injection pressure at acceleration operation in the control apparatus of the direct injection gasoline engine according to the present embodiment will be described in detail with reference to FIG. 22 and FIG. 23.

Figure 22:
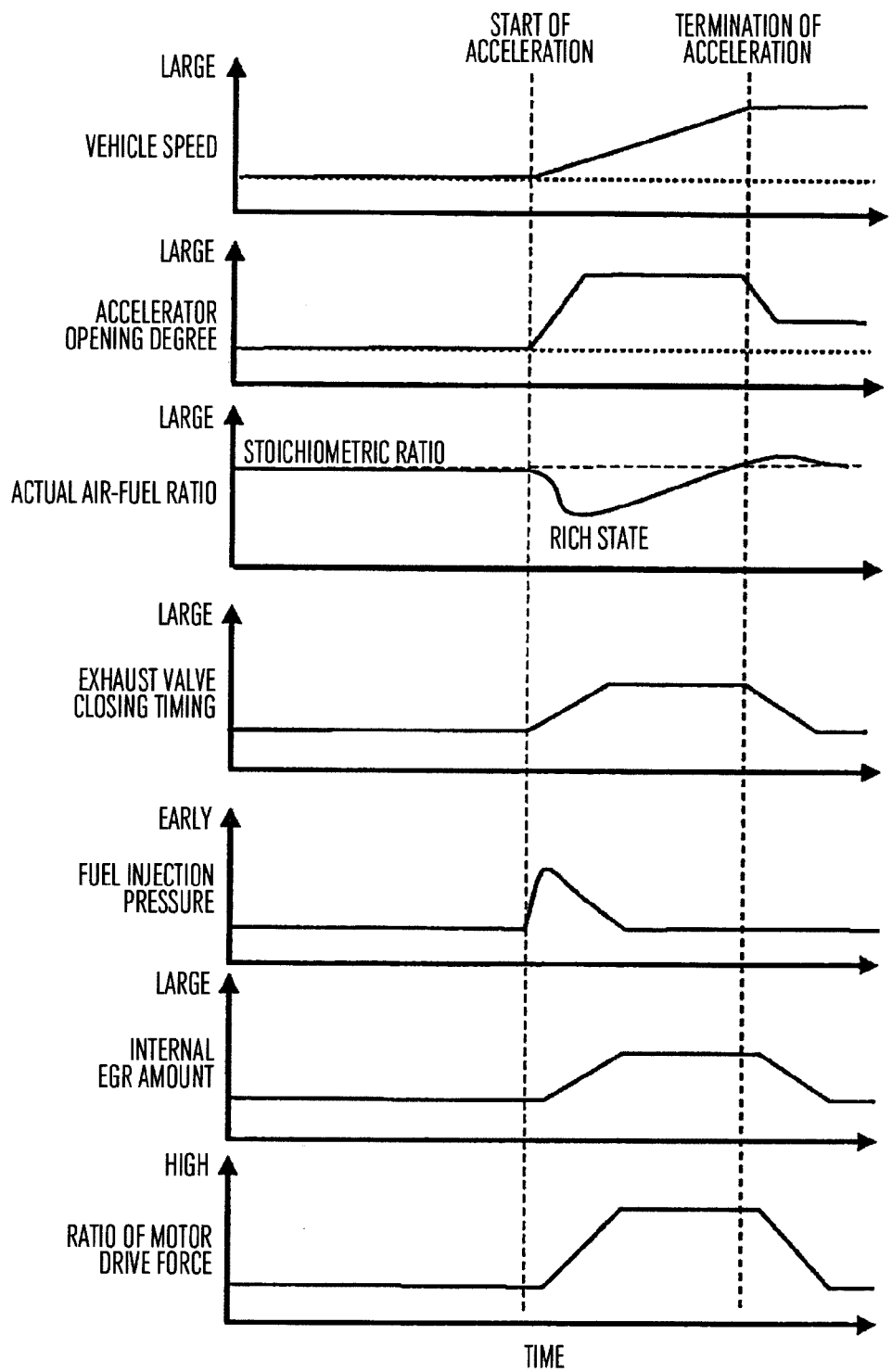
FIG. 22 is a time chart of the control of the variable valve, the fuel pressure, and the motor drive force at the time of acceleration operation in the control apparatus of the direct injection gasoline engine according to the fifth embodiment of the present invention.

FIG. 22 shows a time chart of the control of the variable valve, the fuel injection pressure, and the motor drive at acceleration operation in the control apparatus of the direct injection gasoline engine according to the fifth embodiment of the present invention. In FIG. 22, time-based changes of the vehicle speed, the accelerator opening degree, the actual air-fuel ratio, the exhaust valve closing timing, the fuel injection pressure, an amount of the internal EGR, and the ratio of motor drive force are shown in order from the top. At constant speed operation, the normal exhaust valve control and the normal fuel injection pressure control are performed in accordance with the engine speed and the engine torque. Thereafter, when a driver depresses the accelerator pedal, the accelerator opening degree is increased, so that the vehicle is accelerated. At the time of acceleration operation, it is difficult to maintain the air-fuel ratio in the cylinder at a constant level as described above, and hence the actual air-fuel ratio in the cylinder is shifted to a rich side as shown in FIG. 22. When it is determined that the accelerator opening degree is increased and acceleration operation is initiated, the ECU 20 starts the variable valve control and the fuel injection pressure control for acceleration operation. Specifically, the ECU 20 increases an amount of the internal EGR by advancing the valve closing timing of the exhaust valve, so that, even in the fuel-rich state in the cylinder, vaporization of the fuel is promoted and thereby an amount of PM emission is suppressed. However, response delay exists in the variable valve (exhaust valve) control, and hence it takes about several cycles to several hundred milliseconds until the exhaust valve is closed, that is, until an amount of the internal EGR reaches the target value. Thus, another measure is necessary for suppressing an amount of the PM emission during this period. Therefore, when it is determined that the accelerator opening degree is increased and acceleration operation is initiated, the ECU 20 advances the valve closing timing of the exhaust valve and increases the fuel injection pressure. The fuel injection pressure is controlled by the high pressure fuel pump, and the control response of the high pressure fuel pump is fast. Thus, the high-speed control of the fuel injection pressure can be performed per a cycle unit. With this control, even during the response delay period of the exhaust valve (an amount of the internal EGR) in the initial acceleration stage, the fuel is atomized by increasing the fuel injection pressure, so that vaporization of the fuel is promoted and thereby an amount of the PM emission can be suppressed. Further, the ECU 20 controls the fuel pressure so that the above-described range of increase in the fuel pressure is reduced as the present valve closing timing of the exhaust valve approaches the target value. With this control, the period required to increase the fuel pressure for suppressing an amount of the PM emission can be suppressed to a requisite minimum, so that deterioration of the fuel consumption due to increase in the drive force of the high pressure fuel pump can be reduced.

On the other hand, when the valve closing timing of the exhaust valve is advanced (an amount of the internal EGR is increased) at the time of acceleration operation, there is a possibility that the engine torque (drive force) is reduced by reduction in an amount of new intake air due to increase in an amount of the exhaust gas introduced into the combustion chamber and thereby the response at the time of acceleration operation of the vehicle is deteriorated. Thus, the ECU 20 compensates the reduction in the engine torque with the motor drive force at the time of acceleration operation. As shown in FIG. 22, the ECU 20 increases the ratio of the motor drive force (the ratio of the motor drive force to the total drive force of the vehicle) as the valve closing timing of the exhaust valve is advanced.

Figure 23:
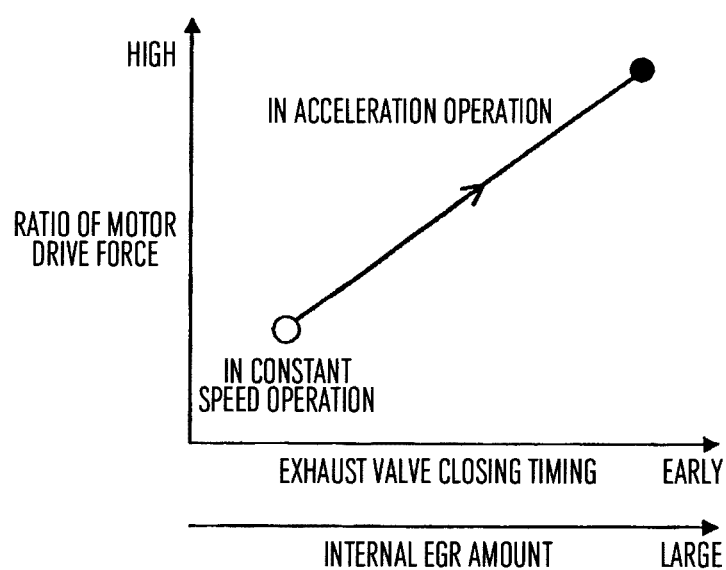
FIG. 23 is a view showing relationship between exhaust valve closing timing and ratio of the motor drive force at the time of acceleration operation in the control apparatus of the direct injection gasoline engine according to the fifth embodiment of the present invention.

FIG. 23 shows relationship between the valve closing timing of the exhaust valve and the ratio of the motor drive force at the time of acceleration operation in the control apparatus of the direct injection gasoline engine according to the fifth embodiment of the present invention. The ratio of the motor drive force required for generating the vehicle drive force required at the time of acceleration operation is set (as represented by the solid line in the drawing) for each valve closing timing of the exhaust valve (for each amount of the internal EGR). Accordingly, when an amount of the internal EGR is small (the valve closing timing of the exhaust valve is late), an amount of new intake air is large and reduction in the engine torque is small, and hence the drive force of the motor is reduced. On the contrary, when an amount of the internal EGR is large (the valve closing timing of the exhaust valve is early), an amount of new intake air is small and reduction in the engine torque is significant, and hence the reduction in the engine torque is compensated by increasing the drive force of the motor.

As described above, in the present embodiment, at the time of acceleration operation, the valve closing timing of the exhaust valve is advanced, further the fuel injection pressure is increased in accordance with the present valve closing timing of the exhaust valve, and further the ratio of the motor drive force is determined in accordance with the present valve closing timing of the exhaust valve. Thereby, it is possible to improve the vehicle response at the time of acceleration operation while suppressing an amount of the PM emission.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus of a direct injection gasoline engine in which an exhaust valve is provided with a variable valve mechanism, the control apparatus comprising operation state determining means for determining operation state of a vehicle, wherein,
when it is determined by the operation state determining means that the operation state of the vehicle is changed from constant speed operation or deceleration operation to acceleration operation:
valve closing timing of the exhaust valve is advanced, and
fuel injection pressure is increased, wherein
the increase in the fuel injection pressure is determined on the basis of the valve closing time of the exhaust valve, and
the increased fuel injection pressure is reduced as the advanced valve closing timing of the exhaust valve approaches a predetermined target value.

2. The control apparatus of the direct injection gasoline engine according to claim 1, wherein the operation state determining means determines the vehicle operation state on the basis of at least one of signals obtained by an accelerator opening degree sensor, a vehicle speed sensor, an acceleration sensor, an intake flow rate sensor, and an intake pipe pressure sensor.

3. The control apparatus of the direct injection gasoline engine according to claim 1, wherein, when it is determined by the operation state determining means that the operation state of the vehicle is changed from constant speed operation or deceleration operation to acceleration operation, air-fuel ratio of air-fuel mixture in a cylinder of the engine is set to a lean side from a theoretical air-fuel ratio.

4. The control apparatus of the direct injection gasoline engine according to claim 3, wherein, when it is determined that the operation state of the vehicle is changed to acceleration operation, the air-fuel ratio is determined on the basis of the valve closing timing of the exhaust valve.

5. The control apparatus of the direct injection gasoline engine according to claim 1, wherein the intake valve is further provided with a variable valve mechanism, and wherein, when it is determined by the operation state determining means that the operation state of the vehicle is changed from constant speed operation or deceleration operation to acceleration operation, the valve closing timing of the intake valve is advanced.

6. The control apparatus of the direct injection gasoline engine according to claim 1, wherein a motor is further provided at an output shaft of the engine directly or via a gear, and wherein, when it is determined by the operation state determining means that the operation state of the vehicle is changed from constant speed operation or deceleration operation to acceleration operation, drive force of the gasoline engine or drive force of the motor is controlled so that ratio of the drive force of the motor to total drive force of the vehicle is increased.

7. The control apparatus of the direct injection gasoline engine according to claim 6, wherein the ratio of the drive force of the motor to the total drive force of the vehicle is determined on the basis of the valve closing timing of the exhaust valve.

* * * * *